(12) United States Patent
Abu-Hakima et al.

(10) Patent No.: US 8,291,011 B2
(45) Date of Patent: Oct. 16, 2012

(54) ALERT BROADCASTING TO A PLURALITY OF DIVERSE COMMUNICATIONS DEVICES

(76) Inventors: Suhayya Abu-Hakima, Kanata (CA); Kenneth E. Grigg, Kanata (CA)

(*) Notice: Subject to any disclaimer, the term of this patent is extended or adjusted under 35 U.S.C. 154(b) by 219 days.

(21) Appl. No.: 12/329,448

(22) Filed: Dec. 5, 2008

(65) Prior Publication Data

US 2010/0146057 A1    Jun. 10, 2010

(30) Foreign Application Priority Data

Dec. 6, 2007   (WO) ................ PCT/CA2007/002197

(51) Int. Cl.
 *G06F 15/16* (2006.01)
(52) U.S. Cl. .................. 709/203; 455/404.1; 379/37
(58) Field of Classification Search ........... 707/9, 104.1; 340/351; 370/230, 311; 709/223, 224, 228, 709/206; 380/282, 247; 719/318; 379/37; 455/435.1, 556.1, 466; 399/8; 706/10
See application file for complete search history.

(56) References Cited

U.S. PATENT DOCUMENTS

| | | | |
|---|---|---|---|
| 5,708,909 A * | 1/1998 | Yamashita et al. ................ 399/8 |
| 6,499,021 B1 * | 12/2002 | Abu-Hakima ................. 706/10 |
| 6,691,151 B1 | 2/2004 | Cheyer et al. |
| 6,820,237 B1 | 11/2004 | Abu-Hakima |
| 6,823,331 B1 | 11/2004 | Abu-Hakima |
| 7,010,303 B2 | 3/2006 | Lewis et al. |
| 7,034,691 B1 | 4/2006 | Rapaport et al. |
| 7,036,128 B1 | 4/2006 | Julia et al. |
| 7,062,723 B2 | 6/2006 | Smith et al. |
| 7,069,259 B2 | 6/2006 | Horvitz et al. |
| 7,069,560 B1 | 6/2006 | Cheyer et al. |
| 7,085,588 B1 * | 8/2006 | Pfister et al. ............... 455/556.1 |
| 7,130,887 B2 | 10/2006 | Goldberg |
| 7,133,869 B2 * | 11/2006 | Bryan et al. ..................... 707/9 |
| 7,136,661 B2 * | 11/2006 | Graske et al. ................ 455/466 |
| 7,165,093 B2 | 1/2007 | Smith et al. |
| 7,181,017 B1 * | 2/2007 | Nagel et al. ................... 380/282 |
| 7,301,914 B2 * | 11/2007 | Segal et al. ................... 370/311 |
| 7,409,428 B1 * | 8/2008 | Brabec et al. ................ 709/206 |

(Continued)

FOREIGN PATENT DOCUMENTS

CA    2505223    6/2004

(Continued)

OTHER PUBLICATIONS

International Search Report from PCT application No. PCT/CA2007/002197; search completion date Sep. 2, 2008; mailing date Sep. 3, 2008.

(Continued)

*Primary Examiner* — Dustin Nguyen
(74) *Attorney, Agent, or Firm* — Oppedahl Patent Law Firm LLC

(57) ABSTRACT

A system for the broadcast of alert messages to selected groups of recipients and their communications devices of a plurality of different types and communicating through a plurality of different communications means. Recipient profiles or characteristics are received variously from databases, directories, and communications nodes accessible by the system. These sources are queried for the identification of selectable groups which are then presented to a dispatcher for choosing the recipients. The alert message is then provided to delivery means which employ a plurality of included means each of which is particularly configured to communicate the alert message to a corresponding target device type. A response handler module then receives responses from the target devices for later reporting.

24 Claims, 7 Drawing Sheets

U.S. PATENT DOCUMENTS

| | | | |
|---|---|---|---|
| 7,664,233 B1* | 2/2010 | Kirchmeier et al. | 379/37 |
| 7,685,265 B1* | 3/2010 | Nguyen et al. | 709/223 |
| 7,965,842 B2* | 6/2011 | Whelan et al. | 380/247 |
| 2004/0064566 A1* | 4/2004 | Striemer | 709/228 |
| 2004/0140989 A1 | 7/2004 | Papageorge | |
| 2004/0193617 A1 | 9/2004 | Adler | |
| 2005/0227672 A1 | 10/2005 | Lauzon et al. | |
| 2006/0109113 A1 | 5/2006 | Reyes et al. | |
| 2006/0161635 A1 | 7/2006 | Lamkin et al. | |
| 2006/0234672 A1 | 10/2006 | Adler | |
| 2006/0273893 A1* | 12/2006 | Warner | 340/531 |
| 2007/0002736 A1* | 1/2007 | Gade et al. | 370/230 |
| 2007/0083561 A1* | 4/2007 | Lai et al. | 707/104.1 |
| 2007/0123256 A1* | 5/2007 | Whitesell et al. | 455/435.1 |
| 2008/0066082 A1* | 3/2008 | Choi | 719/318 |
| 2009/0055220 A1 | 2/2009 | Rapaport et al. | |
| 2009/0325538 A1 | 12/2009 | Senett et al. | |
| 2010/0146057 A1 | 6/2010 | Abu-Hakima et al. | |
| 2010/0199188 A1 | 8/2010 | Abu-Hakima et al. | |
| 2010/0306061 A1 | 12/2010 | Wagner | |
| 2011/0119371 A1* | 5/2011 | Toshima et al. | 709/224 |

FOREIGN PATENT DOCUMENTS

| | | |
|---|---|---|
| CA | 2460270 | 10/2004 |
| FR | 2849948 | 7/2004 |
| WO | 2009070882 | 6/2009 |

OTHER PUBLICATIONS

International Search Report from PCT application No. PCT/CA2008/002119; search completion date Feb. 13, 2009; mailing date Mar. 16, 2009.

International Search Report and Written Opinion relating to international application No. PCT/CA2010/000510 with international filed Apr. 9, 2010.

* cited by examiner

ALERT BROADCASTING TO A PLURALITY OF DIVERSE COMMUNICATIONS DEVICES

COPYRIGHT NOTICE

A portion of the disclosure of this patent document contains material that is subject to copyright protection. The copyright owner has no objection to the facsimile reproduction by anyone of the patent document or the patent disclosure, as it appears in the United States Patent and Trademark Office patent files or records, but otherwise reserves all copyright rights whatsoever.

BACKGROUND OF THE INVENTION

1. Field of the Invention

The invention relates generally to communication systems and more particularly to systems for providing alert broadcasting.

2. Description of the Related Art

It is becoming increasingly important and desirable for societal authorities, such as municipal governments, universities, hospitals, the police, and security firms in large office buildings to be able to notify the people in the area under their control of a specific and unexpected danger. For example, if there is a school shooting, a hostage-taking, a fire, a hazardous chemical spill, a gas leak, an Amber Alert for a missing child, or any other event where the danger relates to a person's proximity, it is crucial that the authorities be able to communicate with as many people in the area as possible in order to warn them, to give them instructions as to how best to avoid the danger, and how to avoid causing a diversion of the authorities' resources by becoming entangled in the initial danger or by creating a new peril.

Unfortunately, known systems, such as public radio or television broadcasts, are typically directed to a fixed and limited set of communications devices and do not, therefore, take into account the modern reality that people use of a variety of different communications devices depending on the context. For example, in the case of a school shooting at a university, the police or university security service may broadcast a warning via the university radio or television stations; however, a student studying in a quiet corner of a basement room of a campus library might not receive this warning, and might not be noticed by campus security or passers-by. Unless the student fortuitously encounters another person who has heard the warning, he or she might remain oblivious to a danger which is perilously close. Although the student might possess some other means of communication (e.g. a cellular telephone, or a laptop computer connected via WiFi to the school's network), the availability of such means are of little value if the authorities are not equipped to broadcast alerts through such communications means in an efficient and reliable manner.

There is, therefore, a need for a solution that provides for broadcasting alerts to a plurality of diverse communications devices, whether the devices are mobile or stationary, through a plurality of diverse communications means. It would include means for identifying appropriate recipients in connection with each type of communications device, such as by selection from a list or by determining each recipient's presence in a particular area. The solution should be configured to maximally utilize the capabilities of any device type, but also take into account the limitations presented by any other device type, and specifically should be capable of transmitting images or documents when available. It would also be desirable for such a solution to be able to confirm receipt of the alert, to allow a response from the recipient to the broadcast source to give situational intelligence, and to allow a two-way discussion between the broadcast source and recipients to help direct them through the emergency. Furthermore, it should not enable a new pathway for "spam" or other unsolicited or undesirable information to reach the user.

Such a solution would also be useful for community-oriented, non-emergency situations, such as public announcement alerts in schools, from police about traffic situations, etc.

BRIEF SUMMARY OF THE INVENTION

The within-disclosed invention includes a system which enables an authority using the system, such as a municipal government, a university, a hospital, the police, or a security firm, to broadcast an alert to a plurality of users who are using a diversity of communications devices, through a diversity of communications means, to confirm receipt of the alert, and to ensure that such does not create an additional communications pathway for spam or other unwanted communication. The system is adaptable to broadcast an alert to any desired communications technology capable of receiving and displaying messages, such as fixed or mobile IP-connected devices (e.g. mobile or stationary computers, handhelds, smartphones, etc), SMS/MMS-capable devices, e-mail-capable devices, voice-capable devices (telephones, radios, etc.), or image-capable devices (e.g. televisions, monitors, smartboards, etc.). Such alert messages may include text, pictures, video, voice, or any other method of communications.

The invention enables efficient broadcasting of messages to a large number of recipient devices, both mobile and stationary. Recipients may be selected by their presence in a list within a database, within a directory, within a set of devices associated with a wireless network controller or access point, or within a set of devices found to be located within a geographical region. Broadcast messages may be prioritized to indicate preferential delivery order. Reception of the broadcast may be explicitly confirmed by the recipient (e.g. by a DTMF signal, by an SMS/MMS response, or by an e-mail response), or implicitly confirmed by the broadcast client.

The invention may be found in a system for communicating a message to a plurality of recipients, each recipient being associated with a respective communications device, each device being a respective one of a plurality of device types, each device having a respective address. The system includes a dispatch module, a delivery module, and a database. The dispatch module is for receiving the alert message, a specification of the recipients, and the device type of each of the devices. The delivery module is for receiving from the dispatch module the message, the specification of the recipients, and the device types; the delivery module is further for receiving the device addresses based on the specification of the recipients; the delivery module is further for communicating the message to the devices, the delivery module having for each device type a corresponding delivery sub-module for communicating the message to the devices of that device type. The database is for receiving and storing the message, the specification of the recipients, an identifier for each recipient, the device types, and the device addresses.

The invention may also be found in a system for communicating an alert message to a plurality of recipients, each recipient being associated with a respective communications device, each device being a respective one of a plurality of device types, each device having a respective address. The system includes dispatch means, an agent framework, and a database. The dispatch means is for receiving the alert message, a list of the recipients, and the device type of each of the devices. The agent framework is operatively connected to the dispatch means and operates a plurality of autonomous agents including a broadcast agent. The broadcast agent is for receiving from the dispatch means the alert message, the list of recipients, and the device types; the broadcast agent is further for receiving the device addresses; the broadcast agent is further for communicating the alert message to the devices, and has a corresponding pooled agent for each device type for communicating the alert message to the devices of that device type. The database is for receiving and storing the alert message, the list of the recipients, the device types, and the device addresses. In an alternative embodiment, the plurality of autonomous agents includes a broadcast agent and a content delivery agent. The broadcast agent is for receiving from the dispatch means the alert message, the list of recipients, and the device types, and is further for receiving the device addresses. The content delivery agent is for communicating the alert message to the devices, and has a corresponding pooled agent for each device type for communicating the alert message to the devices of that device type.

BRIEF DESCRIPTION OF THE DRAWINGS

An understanding of the exemplary embodiments will be obtained from the following description, with reference to the following drawings in which.

DETAILED DESCRIPTION OF EXEMPLARY EMBODIMENTS OF THE INVENTION

Figure 1:
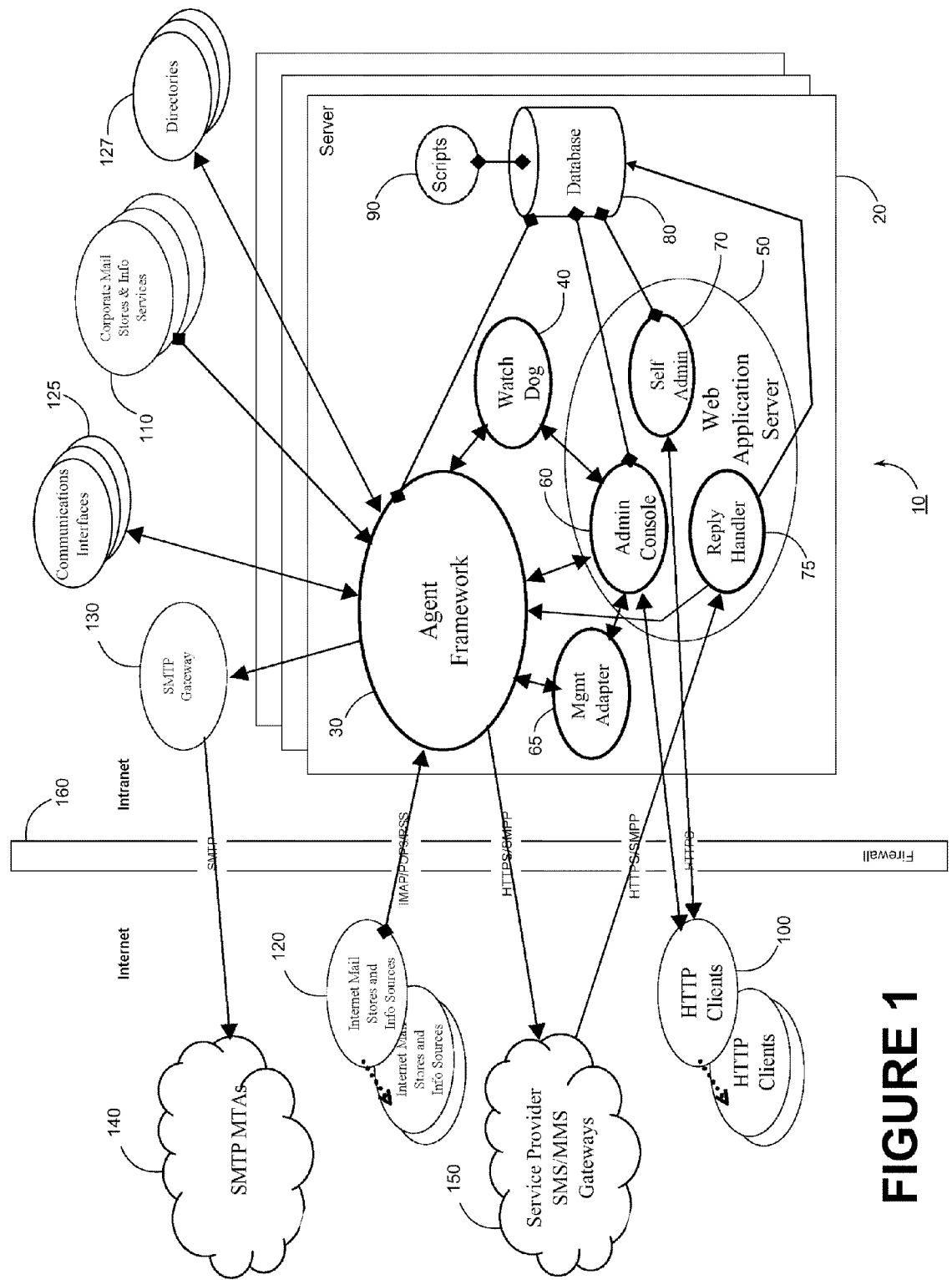
FIG. 1 shows a schematic diagram illustrating an exemplary system employing an agent framework particularly configured for alert message broadcasting in accordance with the present invention.

The advantages of the invention may be obtained through the exemplary systems described hereinafter with reference to the drawings. Where appropriate, the same reference numerals are used in the drawings to indicate like features in all of the drawings.
Exemplary System Overview The system provides for the prioritized broadcast of alert messages to selected groups of recipients and their communications devices. Recipient profiles are maintained variously in databases, directories, and communications nodes accessible by the system. These sources are queried for the identification of selectable groups, which are then presented to a dispatcher (e.g. a system administrator or other broadcast authority) for choosing the recipients. The alert message is then provided to a delivery module which employs a plurality of included modules each of which is configured to communicate the alert message to a corresponding target device type. A response handler module then receives responses from the target devices for later reporting.

Figure 7:
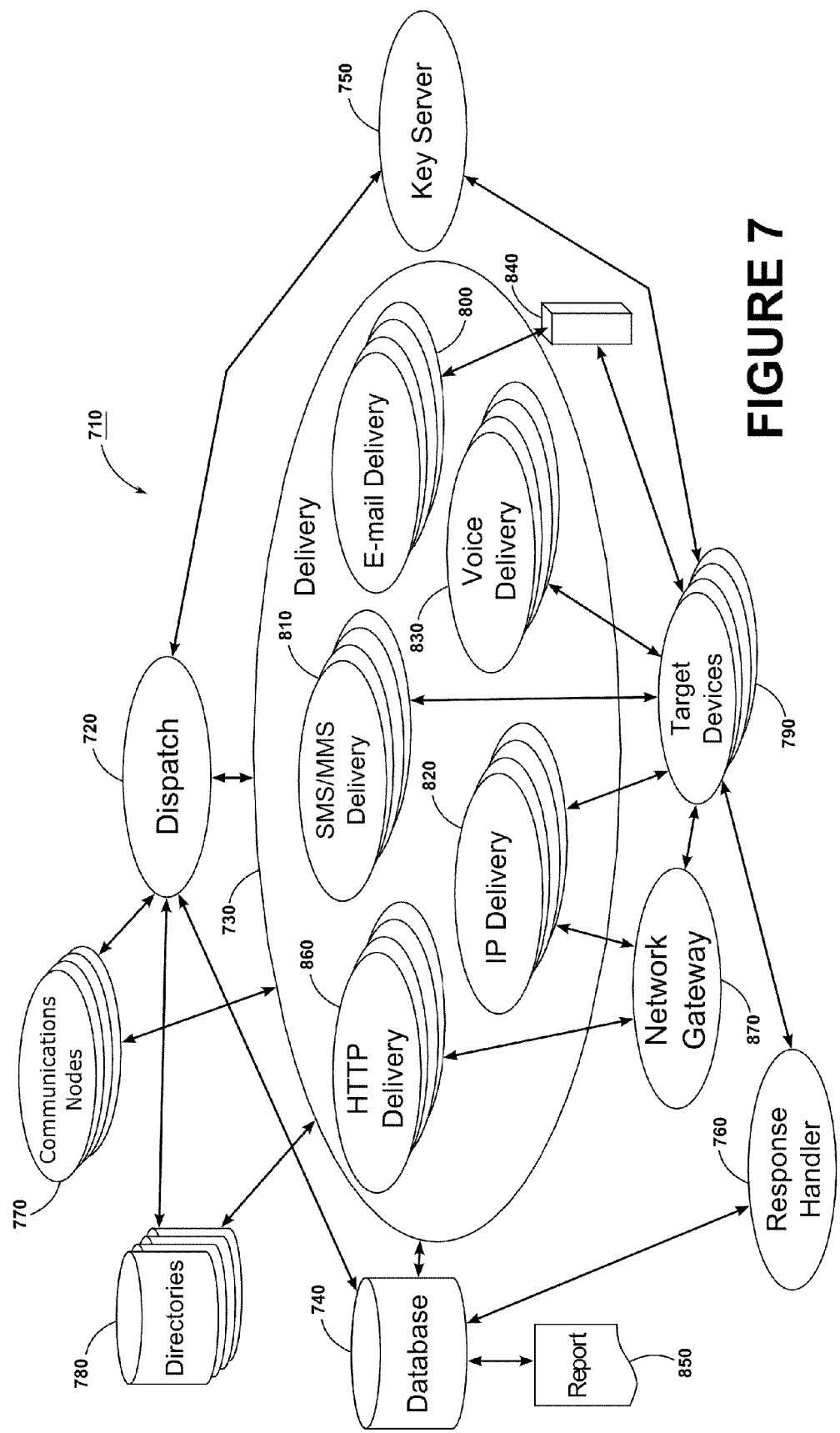
FIG. 7 shows a schematic diagram of an exemplary system for alert message broadcasting to a plurality of different target device types in accordance with the present invention.

The system also provides for the determination of a recipient's context and the processing of alert messages for the intelligent miniaturization or other tailoring thereof for the recipient's communications device or a set of designated delegates' devices, and the forwarding of the processed content to the target device(s).
Exemplary System Components FIG. 7 shows a schematic diagram illustrating an exemplary system 710 for broadcasting alert messages to a plurality of communications devices. The system includes a dispatch module 720, a delivery module 730, and a database 740; the system may also include a key server 750 and a response handler 760. As described hereinafter, the system 710 may interface one or more communications nodes 770 (e.g. network wired/wireless switches and routers, and wired or wireless access points) and one or more external directories 780 (e.g. databases used to identify personnel and network-attached device identities in an enterprise/campus network, telephone directories, directories of client computer hostnames configured in a network domain, or distribution lists). The system 710 further communicates with a plurality of target communications devices 790. As described hereinafter, the target devices 790 may include any communications device capable of receiving an alert message from the system 710.

The delivery module 730 may include or be associated with any number of subsidiary modules (800, 810, 820, 830, 860) each of which is specific to a particular communications technology. For example, the delivery module 730 may include an e-mail delivery module 800, an SMS/MMS delivery module 810, an IP delivery module 820, a voice delivery module 830, and/or an HTTP delivery module 860. As described hereinafter, the delivery module 730 may be extensible to include any additional modules for further known, or as-yet unknown, communications technologies and means.
Dispatch Module The dispatch module 720 provides functionality for enabling a dispatcher (e.g. a system administrator or other broadcast authority) to formulate an alert message for broadcast, to select the intended recipients of the alert message, and to select the methods by which the intended recipients will receive the alert message. The dispatch module 720, therefore, includes functionality for compiling selectable groups of recipients from a plurality of sources for selection by the dispatcher. Any means may be employed to present the dispatcher with such selectable lists, to enable to dispatcher to select or to process such lists to facilitate selection, or to enable the dispatch module to make such selections automatically based on a preconfigured set of selection criteria.

The selectable lists may include lists of subscribers who have previously registered or subscribed, or otherwise indicated that they wish to receive alert broadcasts from the system. For example, the system database 740 may store the particulars of recipients who have previously registered to receive alert broadcasts, and the system may include or interface with any suitable means for enabling such subscription or registration by prospective recipients. The recipient particulars stored in the database may include only some identifier of the registered recipient, or may also include the addresses of one or more communications devices at which the recipient desires to receive such alert messages, and may also include any desired delivery preferences (e.g. so as to specify an order of the recipient's devices in which the system is to attempt delivery of an alert message). In the case of such registered recipients, the dispatch module 720 retrieves lists of such registered recipients from the system database 740 for selection, as discussed above.

Additionally (or alternatively, perhaps for efficiency purposes) the selectable lists may include any keys that are searchable in any of the database 740, the directories 780, and/or the communications nodes 770. For example, the database may associate subscribers with specific wireless carriers, specific e-mail domains, specific hosting servers, etc. A directory may associate subscribers, non-subscribers, and/or devices (computers) with specific corporate groupings or locations. And a communication node might associate specific devices with a specific LAN, virtual LAN, wireless access point, etc. Such keys may specify criteria for identifying the recipients' devices as opposed to identifying specific recipients.

For such purpose, the dispatch module 720 may poll, at the instantiation of the dispatcher, automatically on a periodic basis, or otherwise, one or more of the directories 780, and retrieve selectable lists of recipients. Such external directories may include telephone directories, a directory of client computer hostnames configured in a network domain (which may further be organized in the directory by, e.g. location), distribution lists of recipients which may be cross-referenced in the database 740 to target device MAC addresses, phone numbers, hostnames, etc., or subscriber directories provided by third-party service providers such as e-mail servers or Internet service providers.

Additionally for such purposes, the dispatch module 720 may also interface one or more communications nodes 770 accessible to the system 710 which are capable, through such interface, of providing information regarding selectable groups of recipients not necessarily included in the system database 740 (e.g. who have not registered to receive alert broadcasts). In general, the system 710 may employ any known means to ascertain from the one or more communications nodes 770 recipients who are accessible via any of the means available to the delivery module 730.

For example, one communications node 770 may be a network access point (e.g. a WiFi/WiMAX network gateway, WiFi/WiMAX access point, or home/business cable modem or DSL interface), and the dispatch module 720 may poll that network access point to obtain a list of MAC or IP addresses, or hostnames accessible via that access point. In the event that a device so identified is associated in the database 740 to a registered subscriber, the dispatch module 720 may also retrieve any other of that subscriber's device addresses (e.g. cell phone number, e-mail address) recorded in the database 740 for use in the selection of broadcast message target criteria. For example, an SMS alert might be sent to the cell phones of subscribers whose mobile device (e.g. laptop or smart phone) is associated with a specific WiFi access point. Similarly, an IP-based alert might be sent to the mobile devices of all users associated with all reachable wireless access points within a specific radius of a geographical location (wherein the communication node may provide geo-coordinates of each access point.)

Similarly, for recipients using devices in a logical or physical proximity, such as cellular telephones wirelessly connected to a given cellular network node (one of the communications nodes 770), telephones wires to a given distribution node (one of the communications nodes 770), or computers connected wirelessly to a WiFi node (one of the communications nodes 770), such nodes may be configured to cooperate with the system such that the system may query or poll such nodes for information regarding any target devices currently accessible via such node, including the addresses of any such devices. Such recipient information and device address may be included in the selectable groups for selection in the dispatch module 720. In such case, an alert message may be delivered to all or a portion of such devices related by a certain logical or physical proximity to a given communications node. For example, in the case that the devices include cellular and/or land-based telephones, then an alert message may be delivered by the voice delivery 830 module (and/or SMS/MMS Delivery 810 for, e.g. SMS/MMS-enabled cellular phones) to all or a portion of such devices being serviced by a particular cellular network node or a certain land-based telephone network node.

The dispatcher, or the automated dispatch module 720, as the case may be, then selects from the selectable groups compiled in the dispatch module 720 those recipients or the characteristics of recipients to receive a broadcast alert message. The dispatch module 720 then transmits the list, the alert message, and the targeted mobile device types in a data package or any other suitable form, to the delivery module 730 for delivery to the recipients' target devices 790.

For example, the dispatch module 720 may specify the characteristics of the recipients as being customers of a specific wireless carrier in a specific set of area codes, with the target being their e-mail addresses. The e-mail addresses of those recipients are then retrieved by the delivery module 730 from the database 740; where a recipient is to receive the alert message by SMS/MMS transmission, then the recipient's SMS address is retrieved from the network infrastructure of the MAC address of that recipient's device which is associated with a particular access point in the network infrastructure; where a recipient's device is connected via IP to an access point in the network infrastructure, then that device's IP address may be retrieved from the network infrastructure; similarly, the hostname for the recipient's device which is registered in a particular domain (e.g. in a specific building) may be retrieved from a directory; where a recipient's device is a telephone, the recipient's telephone number may be retrieved from a directory, including a particular distribution list in the directory.

It is to be appreciated that the dispatch module 720 may further provide the dispatcher to capacity to generate and dispatch alert messages from a location which is remote to the system 710. For example, the dispatch module 720 may additionally provide a web portal accessible via the Internet and a web browser, or a telephony interface accessible by calling a number, and further an interface usable by the dispatch to generate an alert message, compile a list of recipients as discussed above, initiate the communication of the alert message to the recipients, and to receive and work with response reports (as discussed below).

Delivery Module

In general, the delivery module 730 receives the alert message, the recipient characteristics (actual device addresses or one or more keys that are queryable in any of the database 740, the directories 780, and/or the communications nodes 770) and the preferred target device type(s) (which may be included in a data package, as indicated above), as described above, from the dispatch module 720.

If the dispatch module 720 provides only the characteristics of the broadcast recipients to the delivery module 730, then the delivery module 730 queries the database 740, the directories 780, and/or the communications nodes 770 as appropriate to obtain the device-specific address for each target device 790 associated with each recipient to receive the alert message.

As indicated above, the delivery module 730 may include or be associated with any number of subsidiary modules each of which is specific to a particular communications technology. Such specific modules may include an e-mail delivery module 800, an SMS/MMS delivery module 810, an IP delivery module 820, an HTTP delivery module 860, and/or a voice delivery module 830, and may further include any other module directed to another different or related technology or communications means, channel or path. In such case, the delivery module 730, upon receiving the alert message from the dispatch module 720, determines with respect to each target device the communication and performance capabilities of the device. Such capabilities may be specified in the data package with respect to each recipient and, if the target device addresses are provided by the dispatch module 720 in the data package, each target device. The delivery module 730 may, alternatively, query the database 740, the directories 780, or the communications nodes 770, as appropriate, for such capabilities based on the recipient information.

In general, each of the specific delivery modules 800, 810, 820, 830, 860 may perform its functions through a pool of dynamically generated sub-modules or threads. Furthermore, each specific delivery module may contain functionality for tailoring the content of the alert message so as to be receivable and/or more suitable for display by the target device types associated with that specific delivery module. For example, alerts sent by e-mail might be formatted in HTML with embedded logos, attached images/videos/audio, or could be encrypted. Alerts sent by SMS might be groomed to account for different wireless provider and/or device-type capabilities (e.g. some require identification of originator in the body because they do not properly reflect the sender). Alerts sent by IP could contain text, images, video, or audio formatted for rendering on specific devices.

For communicating the alert message to target devices 790 capable of receiving e-mail messages, the delivery module 730 may employ the e-mail delivery module 800. If the particulars received by the delivery 730 module for any particular recipient does not include the recipient's e-mail address, then the delivery module may query the database 740, directories 780, and/or communications nodes 770 for the e-mail address(es) of that recipient. The e-mail delivery module 800 then transmits the alert message to each such recipient's target device 790 via an optional SMTP Message Transfer Agent or gateway 840 and via that recipient's e-mail server. The database 740 may then be updated to record that such messages have been sent. The e-mail delivery module 800 may also generate a plurality of pooled sub-modules to divide such delivery tasks by volume, interface, or any other desired criterion.

For communicating the alert message to target devices 790 capable of receiving messages through a network node generally (e.g. mobile or stationary computers connected to a network access point), the IP delivery module 820 may query the database 740, directories 780, and/or communications nodes 770 for hostnames and/or IP addresses of the corresponding target devices 790. The IP delivery module 820 will then transmit the message to the target devices 790, and may do so by unicast/multicast/broadcast to client applications operating on the devices. Unicast transmissions may be performed via TCP-based handshake or other point-to-point protocol (e.g. as are used by OnStar™ systems). Multicast transmissions may be performed via IP-based or other one-way point-to-multi-point transmission. Broadcast transmissions may be performed via IP-based or other one-way point to all stations transmission. The IP delivery module 820 may then communicate an update to the database 740 indicating the transmission of the alert message to those recipients. The IP delivery module 820 may also generate a plurality of pooled sub-modules to divide such delivery tasks by volume, relevant interface, or any or desired criterion.

The IP delivery module 820 may alternatively, or additionally, communicate with a network service via a network gateway 870 (which may be one of the communications nodes 770, or whose functionality is provided by one of the communications nodes 770), wherein the network service subsequently sends the message to non-IP-accessible target devices 790 over another communications protocol. For example, WiFi devices that are known to a WiFi access point but not authenticated to it are known as "unassociated devices". A client on such an un-associated device could be reachable via layer 2 communications methods in order to receive the alert message from the access point.

For communicating the alert message to target devices 790 capable of receiving messages through a network node generally, but not configured with a compatible client (see below) (e.g. mobile or stationary computers connected to a network access point), the HTTP delivery module 860 may query the database 740, directories 780, and/or communications nodes 770 for hostnames and/or IP addresses of the corresponding network gateways 870. The HTTP delivery module 860 will then transmit the message and recipient characteristics to the network gateway 870. The network gateway 870 then arranges to deliver the message to targeted recipients using implementation-specific methods. The HTTP delivery module 860 may then communicate an update to the database 740 indicating the transmission of the alert message to those recipients. The HTTP delivery module 860 may also generate a plurality of pooled sub-modules to divide such delivery tasks by volume, relevant interface, or any other desired criterion.

For communicating the alert message to target devices 790 capable of receiving SMS/MMS messages (e.g. cellular telephones or smartphones), the alert message may be handled by the SMS/MMS delivery module 810. This module may query the database 740, directories 780, and/or communications nodes 770 for telephone numbers or SMS/MMS addresses, and transmit the alert message to the target devices 790 via an SMS gateway or modem. The SMS/MMS delivery module 810 may then communicate an update to the database 740 indicating the transmission of the alert message to those recipients. The SMS/MMS delivery module 810 may also generate a plurality of pooled sub-modules to divide such delivery tasks by volume, interface, or any other desired criterion.

For communicating the alert message to target devices 790 capable of receiving and playing audio recordings (e.g. telephones, public announcement systems), the alert message may be handled by the voice delivery module 830. This module receives the alert message and, if the alert message does not already identify by reference (or attach) a pre-recorded audio message, it converts the alert message into an audio recording including a voice message based on the textual alert message using any available text-to-voice conversion methods. The voice delivery module 830 may query the database 740 (e.g. for subscribers' telephone numbers), directories 780 (e.g. telephone number directories, including distribution lists), and/or communications nodes 770 (e.g. a telephone system node which may indicate all telephone numbers accessible though that node) for the addresses of the target devices 790 (e.g. telephone numbers), in the event that such addresses are not provided by the dispatch module 720 in or with the alert message package. The voice delivery module may then generate a plurality of pooled modules or threads to communicate the audio message to the target devices 790. In particular, each such pooled module or thread may communicate with a particular instance of communications equipment for communicating with corresponding types of target devices 790. For example, each such pooled module or thread may communicate with a DTMF/VoIP dialer for dialing the telephone number of a target device to receive the audio message. Each such pooled module or thread may be configured to make any desired number of attempts to complete the communication should it receive, e.g. a busy signal or should a call not be answered. In general, such pooled modules/threads may be generated and apportioned the module's delivery tasks according to any desired criterion. The voice delivery module 830 may then communicate an update to the database 740 indicating the transmission of the alert message to those recipients.

Once delivery of an alert message is completed (including, optionally, receipt of delivery confirmations from the target devices 790—see below), then the delivery module 730 may record such delivery in the database 740. For example, in the case of communication by the voice delivery module 830, then such module may update the database 740 to record the result of an attempted communication with a particular target device 790, e.g. an attempted call to a telephone, with such result including, e.g. unanswered, busy, heard, responding.

Client Application

The system 710 may also be configured to cooperate with corresponding alert broadcast clients resident on one or more of the target devices 790. Such clients may be configured to receive the alert message and any associated information from a corresponding specific delivery module 800, 810, 820, 830, 860 associated with the delivery module 730. The client may be configured to retrieve or otherwise take active steps to obtain the alert message (e.g. poll a recipient's e-mail server 840, listen for incoming connections from the IP delivery module 820, or listen for incoming SMS from the SMS/MMS delivery module 810), and may provide co-operating functionality as described hereinafter, e.g. to provide a receipt confirmation and response mechanism, and/or to provide message authentication and security. The system 710, including the delivery module 730 and associated specific delivery modules 800, 810, 820, 830, 860 may be configured to prepare any particular communication to a target device 790 so as to cooperate with such a client, or may instead prepare the communication assuming that no such client is operating on the target device 790 (i.e. relying only upon a minimum capability set for that device).

For example, a client on a WiFi-enabled device (associated or unassociated) may listen for incoming connections from the IP delivery module 820, accept the connections, receive and process the payload (optionally authenticate, confirm receipt, display), then disconnect, connect back to the response handler 760 with a user response (when applicable), and then prepare for subsequent connections. (Unassociated devices might have to wait for a WiFi association before providing a confirmation and/or response.) A client on a network gateway 870 could operate in a similar fashion, listening for connections from the HTTP delivery module 860 and/or the IP delivery module. A client on an SMS/MMS-enabled device would listen for incoming messages from the SMS/MMS delivery module 810, receive and process the message payload in a similar fashion, but receipt and user response would be sent back to the response handler 760 as an SMS message if configured to do so.

Response Handler

The system 710 may include a response handler 760 to receive receipt confirmation messages from the target devices 790 and to provide for reporting of the same to the dispatcher, including through the generation of reports 850. Any target device 790 having an alert broadcast client installed or otherwise operating on the device may provide an acknowledgement or other response automatically or at the recipient's command by means of the client.

In the case of the communication of an alert message to a target device 790 capable of receiving an e-mail message, that target device 790 may, automatically or at the command of the recipient operating that device, send a reply message to a response handler mailbox; such reply message may include merely an acknowledgement of receipt of the alert message, or may also include an acknowledgement that the alert message has been read and/or and indication that the recipient is taking some action which may also be specified in the reply message.

In the case of the communication of an alert message to a target device 790 capable of receiving an SMS/MMS message, that target device 790 may, automatically or at the command of the recipient operating that device, send a reply message to a response handler mailbox, if the device has e-mail capability, or to an SMS/MMS short code monitored by the response handler 760.

In the case of the communication of an alert message to a target device 790 capable of receiving an audio message and also capable of responding with an audio message (e.g. a telephone), the recipient may use the target device to respond with DTMF tones or voice-recognized commands to acknowledge that the audio-encoded alert message was received (e.g. heard), and may also indicate that they are taking action in response to the alert message, which may indicate an indication of what action they are taking.

In general, any particular target device 790 having sufficient capability may operate an alert broadcast client application configured to receive and process the alert message and to communicate one or more of the above-described receipt, read, and action acknowledgements, as the case may be, automatically or at the command of the recipient operating the target device. Additionally, the target device 790 may be used to communicate additional situational information back to the dispatcher, such as a text, picture, video, or audio message. Such informative responses could be used to provide content for subsequent broadcasts out to the target recipients in an emergency situation in order to provide guidance or just more information.

Furthermore, inasmuch as the receipt by the response handler 760 of an acknowledgement from a particular target device 790 indicates that such target device 790 is 'alive' and ready to receive further communication, then the dispatcher, upon receiving notice from the response handler 760 that the particular target device 790 is alive, may initiate two-way communications with such device 790 via the response module 730, e.g. by generating a further alert message and compiling a recipient list containing only that device 790, or otherwise. Such a facility is of particular advantage where the particular target device 790 had originally responded to the response handler 760 with situational information, and the dispatcher has been able to determine from such situational information that the user of that target device requires specific instructions in order to avoid a danger, or may have or be able to obtain further useful information.

Once the response handler 760 receives an acknowledgement or other response message from a target device 790, it may then update the database 740 with the details of such acknowledgement or response, and may then inform the dispatcher of the response content via the reporting module 850 or otherwise.

Reporting Module

The system 710 may include a reporting module 850 to generate reports based on the contents of the database 740 or based on any other information receivable by the system 710. Such reports may include information regarding the recipients for which an attempt to communicate the alert message was made, the type(s) of each recipient's target device(s) 790, the address(es) of such device(s) 790, and any acknowledgement(s) or response(s) received from the device(s) 790 via the response handler 760 or otherwise. Such reports may also particularize linkages between multiple alerts and their responses to provide an incident response audit trail.

Message Authentication/Key Server

The system 710 may include a key server 710 module for providing for the authentication of broadcasted alert messages and for avoiding the creation of additional paths for spam to the target devices 790. Any suitable authentication methodology may be employed, including authentication employing public-private key encryption. In such an embodiment, the dispatch module 720 communicates a request to the key server 750 for a message tag and a private key. The key server 750 then generates a new public-private key pair and associated tag, and communicates the tag and private key to the broadcast module 720.

In preparing the alert message for communication to the target devices 790 via the delivery module 730, the dispatch module 720 encrypts some part of the message package using the private key and then packages the recipients' identifiers (and addresses, as the case may be—see above), the alert message, and the message tag. For example, a timestamp included in the alert message, or any other predetermined portion of the alert message, may be encrypted. The package is then communicated to the delivery module 730 for communication to the target devices 790.

Upon receiving the alert message and message tag, any target device 790 configured to authenticate the alert message (e.g. operating a alert message client application configured for such purpose—see above) may communicate with the key server 750 to retrieve the public key associated with the private key used to encrypt a portion of the alert message. The public key may be retrieved from the key server 750 by means of the message tag (i.e. by communicating the message tag to the key server 750). The target device 790 may then decrypt the encrypted portion of the alert message using the public key to authenticate the alert message. For example, if the encrypted portion of the alert message is a timestamp included therein, then the target device 790 would decrypt such portion using the public key, which may in such case be time-limited. (Limiting the public key to a particular time in such case would serve to avoid illicit re-use if the private key is broken or stolen.) The target device 790, or alert message client operating thereon, may then identify the alert message as authenticate only if the decrypted timestamp falls within a predetermined time/date range. In other words, if the decrypted timestamp is too far in the past, or is instead in the future, then the target device 790, or later message client, may consider such message to be unauthentic. In general, any authentication may be employed by the system and target device such as symmetric key cryptography.

In such an embodiment, the public key server is "well-known" to intended recipients. For example, it may be determined "out-of-band" (pre-configured) so as to avoid illicit originators establishing a shadow key server. Alternatively, all alert message clients may be pre-configured with an address or identity of the public key server. Such address or identity may include a preset, well-known hostname, with the advantage that the public key server could be accessed, e.g. across public WiFi hotspots.

Message authentication, such as described above, will generally only be performed in target devices having an alert message client installed/operating. Since not all target devices will ordinarily be capable of operating such a client (e.g. a simple voice telephone), the bulk of the alert message itself is usually not encrypted. However, in special cases where the dispatcher is sufficiently confident that all intended recipients are, or should be, operating a cooperating alert message client, then any part, including the entirety, or the alert message may be encrypted.

The system 710 may also be configured to perform deception detection in the event than one or more target devices 790 indeed receives a counterfeit alert message. For example, the response handler 710 may be configured to compare the acknowledgement or other response information received from a target device with information stored in the database 740 regarding any recently or previously transmitted alert messages and identify and suspicious inconsistency. For example, if a target device 790 transmits a receipt acknowledgement to the response handler 760, but no alert message has been transmitted recently, then the response handler 760 may flag the acknowledgement and either generate a report via the report module 850 or transmit a message to the dispatch module 720 for, e.g. the dispatcher's consideration. Any alert message client installed and operating on a target device may also be configured to include in a recipient acknowledgement from the target device a copy of the received alert message; such copy may then be compared by the response handler 760 with a copy of the original alert message stored in the database 740. Such a comparison technique may also be employed where the target device receives an e-mail or SMS/MMS message, and replies to a response mailbox or SMS/MMS shortcode.

Database

As discussed above, the database 740 stores records for each recipient who registered/subscribed to receive alert messages. The database 740 may also store information concerning any other recipient or target device not registered/subscribed to receive alert messages, but whose identity and/or target device address(es) were determined by any of the means discussed above. Such device addresses may include a MAC address, a telephone number (including a cellular telephone number), a corporate domain user name, a network interface identifier, and so forth. The database also holds the information received by the response handler 760 in order to provide information for the report module 850.

HTTP Delivery Embodiment

In order to identify as many prospective recipients as possible in a physical or logical proximity for receipt of an alert message, any suitable known methods may be employed by the system. For example, it is known for WiFi deployments in public areas to authenticate new users for the purpose, e.g. of obtaining payment information and authorization for access privileges. As described above, such techniques may also be employed in the present system to identify prospective alert message recipients connected to such a communications node and to carry out the delivery of alert messages to them. Further detail of such embodiment is now provided.

For example, a given recipient may be using a computer or handheld wireless device (i.e. that recipient's target device 790) which is networked wirelessly using WiFi or WiMAX or a similar wireless system (i.e. a communications node 770) accessible by the dispatch module 720 and delivery module 730 via the network gateway 870. In such case, the system 710 provides the alert message to the network gateway 870, and may cause the communications node, via the network gateway 870, to redirect the recipient computer HTTP session to a website which either has been updated to contain the alert message, or which requires the recipient to download and install an alert message client application for receiving the alert message. In this way, the installed client may be used to receive and authenticate the subsequently-communicated alert message. (In such case, the downloaded client may be preconfigured with the identity and/or address of, e.g. a public key server where authentication is performed via public-private key cryptography as described above.) In the process, the dispatch module 720 may also capture and record in the database 740 the address of that target device, and communicate a recipient identifier and perhaps also the device address to the delivery module 730 for communication of the alert message to the target device 790.

Accordingly, the selectable groups of recipients available to the dispatch module 720 may include a list of network gateways 870. Such a network gateway 870 may be preconfigured with a page for containing the alert broadcast message, and may further require devices associated with targeted connected access points to view the message page, and may yet further require devices unassociated with targeted connected access points to associate and then view the message page. In both associated and unassociated cases, the network gateway 870 may also track the target devices connected to it and report to the dispatch module an indication of any devices which have received an alert message.

Physical Implementation

The system 710 may be implemented in any combination of hardware and/or software as is considered advantageous and desirable in any particular application. All of the dispatch module 720, the response module 730, the database 740, the key server module 750, the response handler 760, and the report module 850 may reside and operate in a single computer or may reside and operate in any plurality of computers interfaced to each other. In addition, any of the functionality of the various models may be embodied in computer software instructions residing in a memory or a computer-readable medium in communication with a computer, or may alternatively be embodied in special-purpose hardware specifically constructed to perform such functionality. Any of the various interfaces between the various modules and components illustrated in FIG. 7 may be embodied as logical connections between software components or constructs, or may instead be embodied as a physical communication means (e.g. a physical network connection or other data connection such as a data connection to a DTMF dialer). In general, a person skilled in the relevant art may implement the logical functionality of the various parts of the system illustrated in FIG. 7 and described herein to suit any particular application.

Specific Embodiment Employing an Agent Framework

The above-described system may be implemented in any specific hardware/software configuration considered to be most advantageous in any particular context. For example, the system may be embodied in a system such as that described in the Applicant's co-pending International Application No. PCT/CA2007/002197. The details of such specific embodiment now follow. For the purposes of distinguishing and/or describing relationships between the general embodiment previously described and the specific embodiment now described, the embodiments will hereinafter be respectively termed "general system" or "general embodiment" on the one hand, and "system" or "present embodiment", on the other hand.

The present embodiment now described contemplates the provision of alert message broadcasting, as described above, as part of a system also generally directed to providing broader communications services to end users. The inclusion of alert message broadcasting in such a system is particularly advantageous inasmuch as it provides an integration, and therefore simplification, of the communications services needed and/or desired by an end user.

Specifically, the system enables end users to retrieve messages and other selected content from a plurality of sources and for the processing of such messages or other content for the intelligent miniaturization or other tailoring thereof for the user's mobile device or a set of designated delegates' mobile devices, and the forwarding of the processed content to the device(s). Such content may include: passive content—e.g., extracted from messages and informational in nature); or active content—e.g., also extracted from messages, which the user can use to trigger actions such as making a call, starting a chat, ordering payment for a service or product, etc.

The system further provides for the prioritized broadcast of alert messages to selected groups of users and their devices. User profiles are maintained variously in databases, directories, and other communications nodes (as in the general embodiment). These sources are queried for the identification of selectable groups, which are then presented to the system administrator (e.g. the dispatcher) for choosing the recipients. The alert message is provided to broadcast agents within an agent framework which then generate pooled agents specific to each target device type to deliver the message using appropriate messaging channels. The broadcast response agents then watch for and collect responses for later reporting.

Of particular advantage is that the system is adaptable to retrieve messages from any source that is accessible by the system via a network including, but not limited to, the Internet. Such sources include Internet mail transfer agents ("MTAs") and SMS gateways, external and internal mail servers, including RSS feeds, native Web pages, databases, Web and Internet services.

The system provides for the maintenance of a profile for each user, wherein such profile influences the collection, processing, and forwarding of messages and other content to the user's device. The system contemplates multiple user levels wherein such parameters as message box polling frequency, message processing priority, and system resource allocation are influenced by a user's level. In at least one embodiment, the user's profile is accessible, at least in part, by the user to allow him or her to directly select preferences regarding: mailboxes or other sources for content retrieval; the manner in which such content is processed, miniaturized, or otherwise tailored for presentation on the user's device(s); and the devices to which such processed content is to be forwarded while mobile.

The system provides for the maintenance of profiles for closed user groups which influence the processing, context analysis, and forwarding of messages and other content to the devices of the users in such groups.

For accomplishing the above-described functions, the system includes a collaborative, multi-Agent Framework in which interdependent, but essentially autonomous, user-configurable agents perform many of the functions. The Framework interfaces and cooperates with components internal and external to the system, as described hereinafter. A Service providing network-accessible content or services to mobile devices is implemented as an application in the Agent Framework. This Service leverages the Framework to provide a scalable capability for registered end-users to self-manage which specific content reaches their mobile device, including the form in which it is transmitted.

The scalable multi-Agent Framework supports hundreds, thousands, or millions of users through the integration of an intelligent scheduling agent, a database connection agent, and framework support for agent pools containing variable numbers of agents to performing processing tasks. Agents are built on this framework to provide for connecting to content sources (e.g. mailboxes or servers), for applying context-based user preferences with respect to filtering and processing content, for transmitting notifications or alerts to the devices, for triggering Internet services based on active content, and for monitoring problems that may require user intervention.

The system also enables mobile users to respond to notifications through the use of messaging channels back to the Agent Framework from the mobile device. These channels include electronic messaging, SMS, instant messaging, direct IP connections, voice channels, or web browsing. In some cases, responses to notifications can be improved through the use of mobile client-based agents known by the framework. A user might, for example, want to send a "canned" response to the sender, or might want to receive the full text of a message in multiple subsequent messages if the original notification included only a small summary. The system also enables mobile users to respond to notifications through the use of active content provided within the notification. Such active content is used to enable communication methods native to the devices, such as the initiation of voice calls or chat sessions on a mobile phone. Active content may also trigger transactional services such as payment for a product or service by a user through a proxy agent with authorization from the user to perform such payment.

System Components

FIG. 1 shows a schematic diagram illustrating an exemplary system 10 according to the present embodiment. The system 10 includes one or more servers 20 running operating systems within which the Agent Framework 30, the Watch Dog 40, and the Web Application Server 50 operate. An Administration Console 60, an end-user Self Administration Portal 70, and a Reply Handler 75 operate within one or more of the Web Application Servers 50. A Database 80 for capturing and storing all user data runs on another server or cluster of servers. Also included are scripts 90 for performing administrative tasks as described hereinafter.

The system 10 interacts with HTTP clients 100 (e.g. web browsers operated by end users on fixed and/or mobile devices) via a Self Administration Portal 70, whereby the end users can view and modify their profile and status as stored in the Database 80. It also interacts via HTTP (fixed and/or mobile) with administrator users via an Administration Console 60, whereby administrators can monitor and configure the Service profile in the Database 80, the Agent Framework 30, and the Watch Dog 40. As described hereinafter, the Administration Console 60 also employs a Management Adapter 65 to interface the Agent Framework 30.

The system 10 also interacts with sources of passive content (corporate directory servers, mail stores and information services 110, and Internet mail stores and information sources 120) and active content (e.g. Internet services brokers that deliver a service or product to end users after electronic payment) via both standard and proprietary protocols to retrieve new or updated content. Finally, it also interacts with gateways via standard protocols like SMTP, SMPP and SOAP, and interacts with any other provided communications interfaces 125 (e.g. local networking equipment providing access to communications networks, voice telephony equipment) to provide communication to both mobile and fixed end-user devices. Included are an SMTP Gateway 130 which is used to communicate with external SMTP mail transfer agents ("MTAs") 140 for accessing external message sources, and external Service Provider SMS/MMS Gateways 150 (which may include e-mail-to-SMS/MMS Gateways) for interfacing with mobile devices via the SMS/MMS protocol.

In performing its alert broadcasting functionality, the external sources or recipients accessible by the system, identified above, may be included in any of the sources or recipients described in connection with the general system. For example, the Directories 127 may include the corporate directory servers identified above, as well as any other directories 780 as described in connection with the general system. Likewise, the communications interfaces 125 may be included in any of the communications nodes 770 or the network gateway 870 in connection with the general system. Similarly, the SMTP Gateway 130 and/or SMTP MTAs 140 may be included in the SMTP MTA or gateway 840 of the general system.

The Agent Framework 30 is run within a secure environment (e.g. a Java Virtual Machine) and is itself generally implemented as a closed, secure system, but the typical operating environment is in a server 20 behind a secure network firewall 160. It is not reliant upon any specific firewall functionality, but a typical installation will ensure blocking of all access ports except for those required by HTTP, SMTP, POP3 and IMAP, and their encrypted variants.

The Agent Framework 30 provides an environment for application development in the form of collaborating agents. Capabilities include: instantiation, management, and destruction of agents, support for the management of pools of cloned worker agents, inter-agent communication, timer management, and logging.

The management components external to the Agent Framework 30 include two web applications running in a Web Application Server 50. The first is an end-user accessed Self-Administration Portal 70, whereby users subscribe to the Service and manage their profile. This component interacts only with the Database 80. The second is an Administration Console 60 provided for administrators to manage the system. The Administration Console 60 leverages two additional components: a Watch Dog daemon 40, which starts, stops, and ensures robustness of the Agent Framework 30 and the Service; and a Management Adapter 65, which provides a real-time interface into the Service. The Management Adapter 65 in turn communicates with a Management Agent within the Agent Framework 30 in order to retrieve real-time status from agents that make up the Service. Additionally, external to the Agent Framework 30, periodic scripts 90 are run to maintain the Database 80 and to provide additional reporting functionality, such as providing periodic updates to users of the Service's activity regarding their own profiles.

The Service can be deployed either as an enterprise application (i.e. providing services to a group of users authenticated against local corporate domains) or as a service-provider managed application (i.e. providing services to external subscribers that are not members of a cohesive authentication domain). In the case of a corporate deployment, end-users are authenticated for self-management using domain authentication against a directory service. In a service-provider deployment, the Service provides internal authentication and password management. Other than this difference, the Service components are indifferent to the deployment scenario.

In both enterprise and service provider deployments, the system may consist of multiple Agent Frameworks 30 each controlled by a Watch Dog 40 and interfaced with a Management Adapter 65. Each such Agent Framework 30 is identified by a Service ID, and each subscriber is assigned to one Service ID, but may be moved from one Service ID to another to allow for load balancing between different instantiations. Such distributed Frameworks each operate independently, but share the User Database 80, the associated scripts 90, the Self-Administration Portal 70, and the Administration Console 60. In general, however, all of the Agent Framework 30, Watch Dog 40, Administration Console 60, Management Adapter 65, Self-Administration Portal 70, Database 80, and scripts 90 components can be combined into a single server or split into a multiple server solution. In a multiple server scenario, the Agent Framework 30 and Watch Dog 40 components are generally co-located, and may be duplicated for scalability and/or redundancy purposes. Likewise, in cases where the Database 80 is distributed across multiple servers, each such segment or portion will generally be accompanied by scripts 90 for the maintenance of that portion or segment. Multiple Web Application Servers 50 may also be provided with each operating a corresponding Administration Console 60 and/or Self-Administration Portal 70. The end-user Self-Administration Portal 70 and the Administration Console 60 are both constructed to recognize and interact with multiple Framework/Watch Dog combinations.

The management components of the system and the Agent Framework will now be described, followed by a description of components of the Service and its operation.

Service Administration Console Components

The Administration Console 60 provides an interface for administrators to monitor and manage the Service, and to generate alert messages for broadcast (i.e. as a dispatcher in the general system). The Console 60 is a web application that can support multiple instances of the Agent-Framework/Watch-Dog/Management-Adapter environments, which the administrators access by specifying the Service ID.

The Administration Console 60 interfaces locally or across a network with the Management Adapter 65 for access to real-time status information about the Agent Framework 30, for access to agent configuration files, for access to the Watch Dog 40 interface, and for access to utilities that provide local processing of longer commands (such as broadcasting a message to all subscribers on a specific Service ID).

The Console 60 also interfaces directly with the User Database 80 for allowing administrators to monitor and modify subscriber account data and processing results.

In performing the alert broadcasting functionality of the system 10, the Console 60 may further interface for querying the User Database 80 (to retrieve, e.g. user group attributes such as wireless service provider, e-mail provider) and/or Communications Interfaces 125 (e.g. WiFi controller/switch) and Directories 127 (e.g. to retrieve distribution lists, location names) via the Management Adapter 65 and Agent Framework 30 (as described further hereinbelow) for obtaining information regarding prospective alert broadcast recipients. The Console 60 further interfaces the Agent Framework 30, via the Management Adapter 65, for creating the alert message to be broadcast, and for initiating broadcast of the alert by passing a "broadcast package" containing the message to corresponding agents in the Agent Framework 30, as described hereinafter.

In particular, the Console 60 may be employed to select or otherwise affect the system's 10 operational priority with respect to its handling of alert message broadcasts. As described herein, the system 10 may also include and perform general user content and forwarding functionality, and as is described hereinbelow the operational priorities of such functionality may be determined by user classes of service and other scheduling parameters. In performing alert broadcasting, a dispatcher using the Console 60 may assign the alert broadcasting task any desired priority to override such scheduling in order to ensure the expedited delivery of an alert broadcast. Alternatively, the system 10 may be preconfigured to give alert broadcasts the highest priority, i.e. to perform them first in preference to the general user content retrieval and delivery functions of the system 10.

The system 10 may include or provide via the Console 60 a set of templates or other tools to enable or assist a dispatcher to construct an alert message for broadcast using the system 10. The templates or tools may variously correspond with particular target user devices such that, by using such a corresponding template or tool, the content of the alert message will be receivable and displayable/perform-able by that device. For example, one template may limit the alert message to text of a maximum number of characters to ensure that it is receivable and displayable by devices capable of receiving SMS messages. Alternatively, the system 10 may employ a Content Personalization Agent 295, as described hereinafter, to 'tailor' whatever alert message is prepared and forwarded by the Console 60 to the Agent Framework 30 so as to be receivable and displayable/performable by any particular target user device.

The report 850 functionality of the general system 710 may also be implemented in the Administration Console 60 or as an agent in the Agent Framework 30 configured for such purpose.

Service Self-Administration Portal Component

The Self-Administration Portal 70 is a web application accessible via fixed or mobile HTTP clients that provides subscribers with a way to personalize the Service capabilities to match the content sources that are important to them, and to format that content for their particular devices. The portal is independent of specific Service IDs, and interacts only with the User Database 80 for reading User Data and storing back any modifications. Subscribers have no need to know the specific Service ID their account is being processed on.

Subscriber authentication to the portal leverages directory services where they exist, such as in an enterprise deployment or an LDAP-enabled Service Provider environment. In such cases, the subscriber's domain, user name, and password are used not only to authenticate to the Portal, but also to access the prime content source (usually an enterprise mailbox).

Once authenticated, subscribers are presented with a user interface that allows them to see the status of the Service's access to each of their content sources, including any persistent error state, the time of the last content forwarded, the number of content messages forwarded, and other statistics. They can also add/remove content sources, can modify their mobile devices, and can modify the forwarding and formatting personalization settings.

The Self-Administration Portal 70 also supports self-subscription, if enabled by the deployment scenario (i.e. if the Directory Retrieval Agent 570 (described hereinafter) is disabled). In this circumstance, a subscriber can access the Portal 70 anonymously and can fill out a registration form that requires identification of a prime content source (usually an enterprise mailbox) and one destination device.

The Self-Administration Portal 70 further enables a subscriber to subscribe to, and to specify any parameters regarding, an alert broadcasting service of the system 10. For example, a subscriber may specify particular devices at which the subscriber wishes to receive alerts, or to provide any other specification or selection usable by the system in selecting the subscriber as a recipient of an alert broadcast and dispatching an alert message to the subscriber's device(s).

Script Components

Several scripts (or small utility programs) are run periodically by the system in order to maintain the User Database 80 and to provide other administration duties. These scripts include the capabilities for:
- changing the Service Level Agreement of users whose paid interval is over (e.g. change paid to free);
- adding and deleting users (batch subscriptions only: single users are processed in real-time);
- validating users from an external e-commerce system (in a Service Provider environment);
- backing up the database;
- trimming the reporting-related data (transactions) from the database; and
- sending unsolicited messages, for example:
  - to free subscribers: e.g. advertisements for the paid service;
  - to all subscribers: e.g. status messages indicating the processing and notifications performed by the Service for them over the past week or month;
  - to targeted subscribers: advertisements for 3rd parties;
  - to expiring subscribers: warning that their paid service is about to expire and that user will be downgraded to the free service; and
  - to welcome new users.

Collaborative Agent Framework

Figure 2:
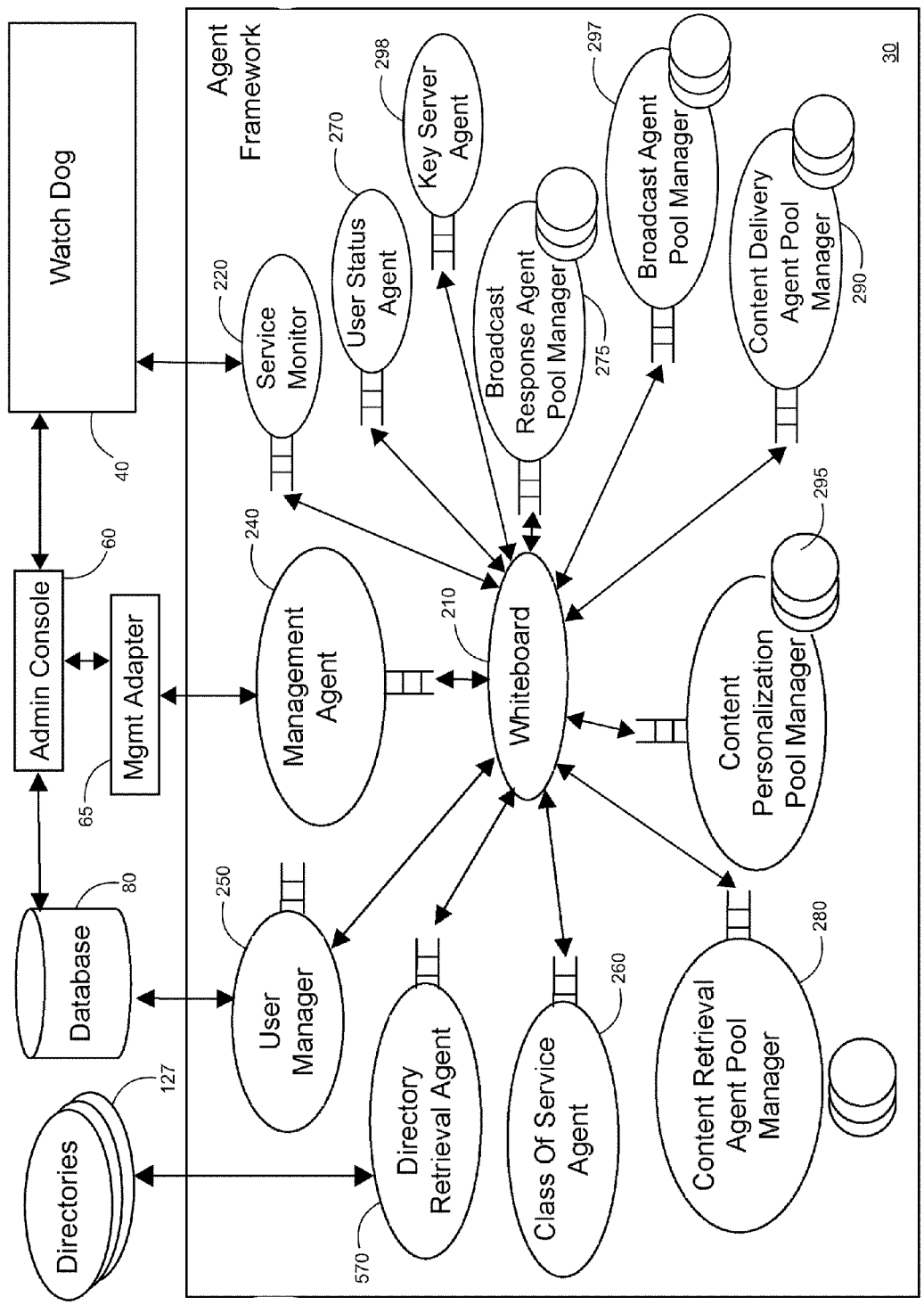
FIG. 2 shows a schematic diagram illustrating components of the agent framework of the system illustrated in FIG. 1.

FIG. 2 shows a schematic diagram illustrating components of the Agent Framework 30, agents of the Service operating in the Framework 30, and several of the system components external to the Framework which have already been introduced. The Framework 30 supports two forms of agents: singleton agents and pooled agents. Any function requiring an agent may be performed by a singleton agent; however, in the exemplary system, pooled agents (described further hereinafter) are ordinarily used for performing Service functions that can be scaled through multiple concurrent activities, and singleton agents typically provide application control or access to and management of constrained resources (such as the pooled agents).

Figure 3:
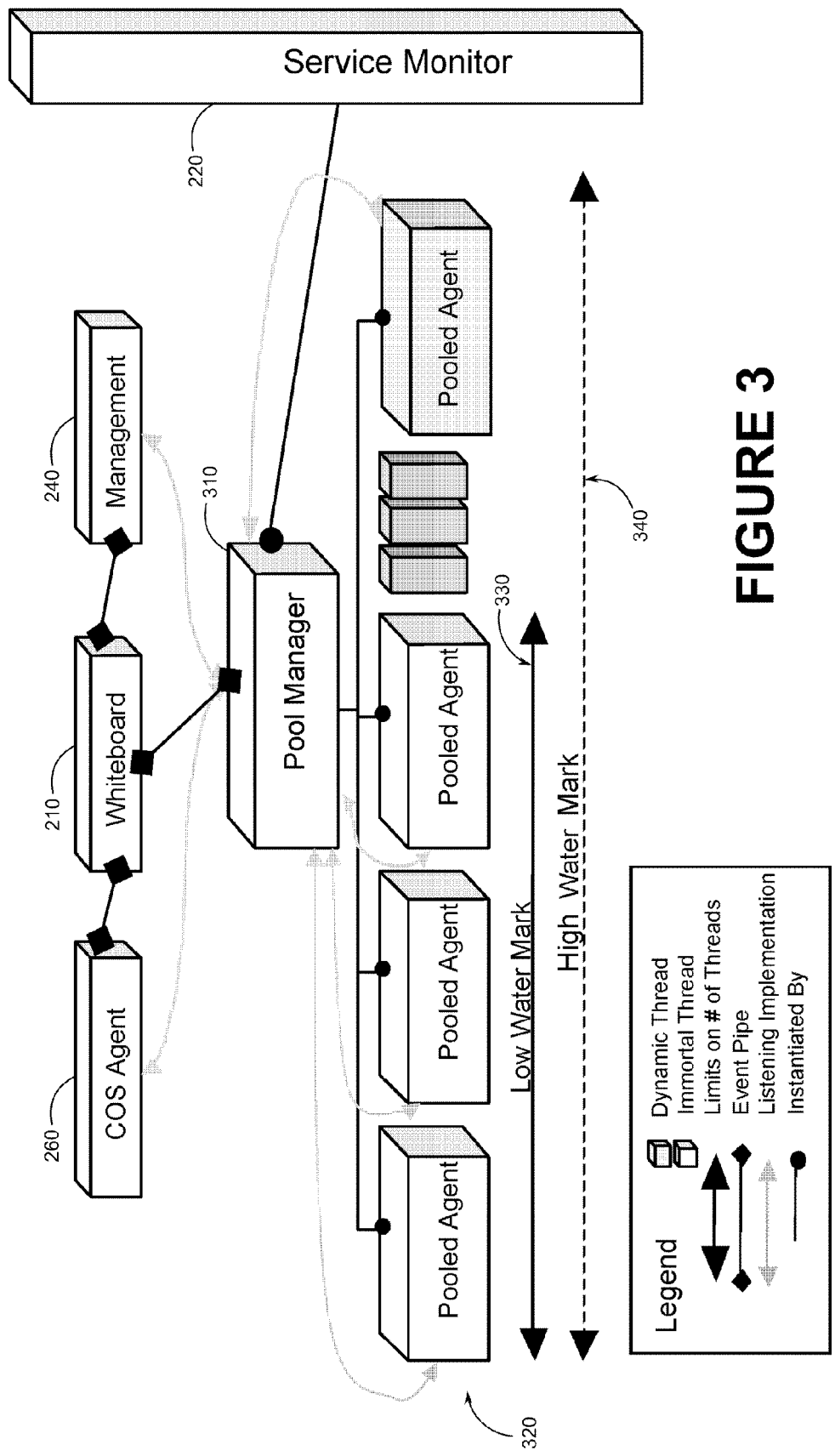
FIG. 3 shows a schematic diagram illustrating an agent pool management framework employed by the agent framework illustrated in FIG. 2.

Singleton agents providing control over pooled agents make use of the pool management facilities of the Framework which support creation, distribution of work, sanity checking, destruction, and reincarnation (i.e. reactivation when excessively delayed in delivering a result) of the pooled agents. The Framework 30 provides the ability to manage performance and scalability by means of agent pool management. With reference to FIG. 3, the Pool Manager 310 manipulates the number of threads provided by an agent for doing work. The role of the Pool Manager 310 is to act like a bridge by allowing a pool of agents 320 to take the place of a single agent, while maintaining the same interface as the single agent. It manages the delegation of received events to the pooled agents 320, and responds to the replaced agent's events normally. Such events are processed in parallel through the pool of agents.

The Pool Manager 310 has operating parameters that place limits on the number of agents within a pool. The minimum number of agents (i.e. the 'low water mark' 330) are automatically instantiated upon pool initialization. The Pool Manager 310 can then create more agents as needed to manage incoming requests, subject to the limitation of the maximum number of agents (i.e. the 'high water mark' 340). In the description and Figures, reference may be made alternatively to a 'poolable agent' or to a pool manager of such agents, but it will be appreciated that either reference includes either alternative.

With reference again to FIG. 2, the Agent Framework 30 provides a Whiteboard 210 messaging system for agent interaction. The Agent Framework 30 also provides timer management facilities supporting the creation and destruction of timers, as well as the handling of timeouts. It also provides logging facilities for hooking the Service into the logging mechanism of the host operating system. Finally, the Framework 30 provides a mechanism for receiving startup, graceful shutdown, immediate shutdown, and sanity check commands from an external entity (e.g. the Watch Dog 40).

Applications running within the Agent Framework 30 are developed using the defined interfaces of the Framework, which require the applications to implement known interfaces for initialization, destruction, and sanity checks. The Service agents integrate into the Framework through either pre-configuration of the Service Monitor Agent 220 or via external injection from the Watch Dog 40. The Service Monitor Agent 220 handles the starting, stopping, and sanity-checking of the Service agents at the request of the Watch Dog 40. The Service agents leverage the Whiteboard 210 interfaces for communications, timers, pool management, and logging.

Agents implemented using the Agent Framework 30 are architected to be event-driven, waiting to receive events (messages and timer events), processing each one to completion, then waiting for the next event. Agents typically keep any persistent configuration data in property files (flat files). When the agent is launched it initializes all of its configuration values from its persistent storage, and then reports that it is ready to start processing events. When it receives a shutdown event it will write any new configuration data to the persistent storage before shutting down.

The Framework components will now be discussed in greater detail.

Framework Whiteboard

The Whiteboard 210 is the messaging service for providing messaging between the agents. Events are sent to the Whiteboard 210 from any agent and forwarded to the queues of any agents that have registered to receive such events. Receiving agents process the notifications in order, to completion, as part of their event loop. This mechanism allows agents to post specific rich content message events and to request notification of the posting of specific events. For example, a worker agent that has completed work could post a Content-Retrieval Complete message, and any waiting application agents would receive the message.

Multiple queues are provided for each agent to support messages of differing priorities, with the number defined by the application's requirements. The agent is given only a single interface to the queues: the Whiteboard 210 ensures that higher-priority events are handled before lower-priority messages.

The Whiteboard 210 is also capable of moving message queues between agent instances. This is done automatically when the Service Monitor Agent (SMA) 220 deems an agent "insane", as described below. After a new clone of the agent is created, the Whiteboard is directed to give the original's incoming message queue to the new agent.

Framework Management

The Agent Framework 30 provides a Service Monitor Agent (SMA) 220 for application management. It provides the start-up, status, and shutdown access point for the agents within the Agent Framework 30. Agents are created variously through SMA 220 configuration properties, through Watch Dog 40 injection to the SMA 220 (where the path to the agent software is identified), or by hard-coding into the SMA 220 start-up list. At Framework start-up, the SMA 220 listens for a connection from the Watch Dog 40 for controlling the service, and, once connected, responds to Watch Dog 40 commands to start, stop, and poll the agents.

Figure 4:
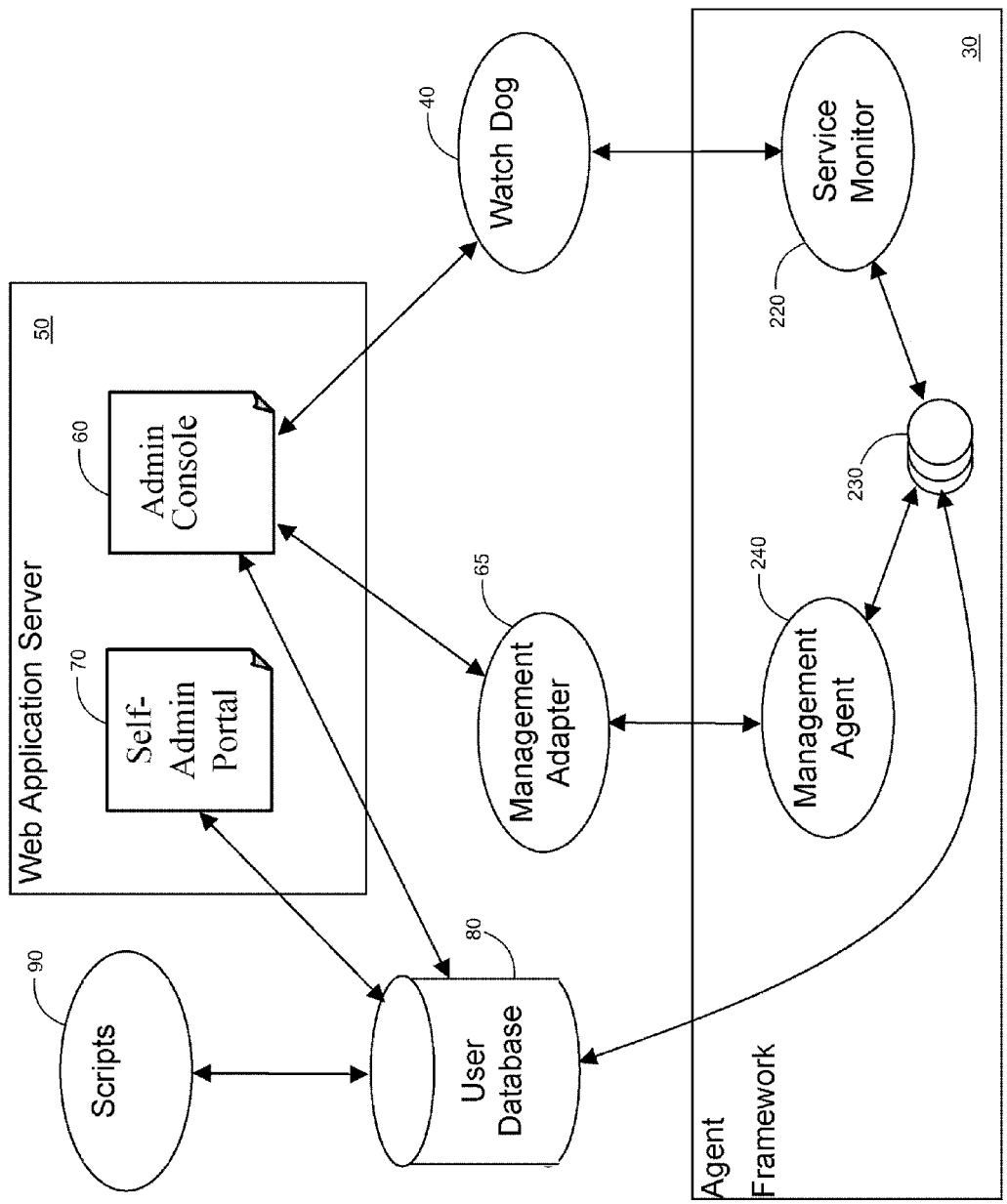
FIG. 4 shows a schematic diagram illustrating a subset of the agents and system components involved in management of the agent framework illustrated in FIG. 2.

With reference to FIG. 3 and FIG. 4, the latter showing a subset of the agents and system components involved in Framework management, the SMA 220 polls the manageable agents 230 (representing any of the Service agents shown in FIG. 2) at the request of the Watch Dog 40 to determine if they are all still alive and able to process events. If a persistent unrecoverable agent failure is detected, the SMA 220 will initiate a service shutdown and report this event back to the Watch Dog 40. When commanded, the SMA 220 initiates a shutdown by asking each agent 230 to shut down (on its high priority message queue), and awaits their responses. Any agents 230 not responding within a configured time are killed. Data may be lost if shutdown is not controlled and the agent 230 has to be terminated.

If a single agent is deemed insane, the Whiteboard 210 will hold messages for such agent until the new instance is up and running. A new instance of the agent will be created and initialized. The new agent's queue will be populated with the messages retrieved from the dying agent via the Whiteboard 210.

Framework Timer Management

The Framework 30 provides agents with the capability to start, stop, and handle interrupts from timers, generally used to provide periodic services and to recover from networking problems. A timer management facility of the Framework allows a client agent to create any number of timers, which can be single shot (one timeout), or repetitive (start again after the first timeout). When a timer expires, it calls back to an interface that the agent provides to the timer management facility. To improve CPU use efficiency, the agent specifies the lowest resolution of timer that is desired (the "tick length"). The timer management facility can thereby minimize processing at each of the system-level timer interrupts, allowing for efficient high and low resolution timers.

Framework Logging

The Framework provides agents with a logging facility for logging activity to mechanisms on the local operating system, or to a central server if multiple Service IDs are in use. It supports run-time determination of the logging method, and offers a factory-based instantiation model, where agents can create their own log headers in order to clearly identify the originator of each log. Additionally, logs from several Agent Frameworks can be combined and centrally located if necessary.

Watch Dog Component

Operating as a persistent "daemon" within each collaborating server, the Watch Dog 40 is started and stopped under administrator control and automatically restarted in the occurrence of a server reboot. The Watch Dog 40 ensures robustness of the Service by maintaining a connection to a corresponding Service Monitor Agent 220 operating within the Agent Framework 30, offering recovery from problems with the Agent Framework 30 that were unforeseen, such as unexpected message formats and/or networking problems that could cause the system to slow down or run out of memory.

At a tunable frequency, the Watch Dog 40 requests a sanity check from the Framework, which returns a status of e.g. red/yellow/green. Agent Framework 30 applications determine what constitutes a yellow or red condition themselves, responding to the Service Monitor Agent 220 which in turn responds to the Watch Dog 40 with a rollup of the individual application states. The Watch Dog 40 responds to the rollup states by restarting the Agent Framework 30 if a red status is returned, or in the case of a configurable number of repeated yellow states. It also treats non-response as a red status, forcing a restart of the Agent Framework 30.

In addition, the Watch Dog 40 produces alerts to inform administrators of automated problem recovery and when administrator assistance is necessary. The Watch Dog 40 further provides a console interface for manually starting/stopping/restarting the service and checking its status, although typically administrators interact with the Watch Dog 40 via an application-specific administration console.

Service Management Agent

The Management Agent (MA) 240 is responsible for managing all real-time management queries from the Management Adapter 65 component (i.e. from the Administration Console 60). It can request that all manageable agents report their status, and can push information to a specific agent for tweaking settings while the system is live. It also listens for critical system errors such as SMTP connection failure, and informs the Management Adapter 65 for administrator notification when such a failure occurs.

The Management Agent 240 further processes alert broadcast information received from the Administration Console 60 via the Management Adapter 65. Specifically, as described in connection with the general embodiment, the Management Agent 240 may receive an alert message package including an alert message for communication to intended recipients, and information identifying such recipients which may also include addresses of the communications device(s) of such recipients. The Management Agent 240 may then communicate, via the Whiteboard 210, with other agents in the Agent Framework 30 for obtaining further target device addresses, as needed, for processing the alert message for particular types of target devices, for communicating the processed alert messages to the target devices, and for receiving and processing responses received from such target devices or otherwise.

Service Application Overview

With reference again to FIG. 2, the Service Application includes a Mobile Network Content Service application operating in the Agent Framework 30 consisting of a set of collaborating agent types: Management Agents (MAs) 240, User Management Agents (UMAs) 250, Class of Service Agents (CSAs) 260, User Status Agents (USAs) 270, Broadcast Response Agents (BRAs) 275, Content Retrieval Agents (CRAs) 280, Content Delivery Agents (CDAs) 290, Content Personalization Agents (CPAs) 295, and Broadcast Agents (BAs) 297. (The latter four are shown as corresponding pool managers; as discussed above, these agents are preferably pool-able agents for managing performance and scalability.) Also included are Key Server Agents (KSAs) 298, as described hereinbelow. As described hereinafter, these agents collaborate to provide real-time broadcasting of alert messages to a plurality of diverse user devices. They also collaborate to provide subscribed users with network-accessible content of interest on their mobile devices in device-appropriate format in near-real-time.

The Service may be used to broadcast an alert message to a plurality of mobile or fixed devices. As in the rendered content case, discussed below, the Service may employ any device-appropriate formatting. The Service forwards these broadcast alert messages in real-time, initiating the broadcast immediately upon reception of the message.

The Service may further be used to forward to a mobile device any content accessible by the server on which the Service agents reside. Examples are: e-mail from mail store mailboxes; blog content from RSS feeds (or other methods); web content from WAP or HTTP access (or other methods); active Internet content requiring user response or authorization, e.g. for payment for a service or product; textual data from database queries or Service-Oriented Architecture (SOA) queries (or other methods); and documents, document text and images from file servers and document repositories. Content is deemed 'of interest' if it meets any of the subscriber's configured preferences, which involves filtering against metadata from the content. Examples are the content originator or a phrase included in an 'allow list' and not in a 'block list', or if the content appears within a specific timeframe, or the content is of a specific format (e.g. a voice message).

In rendering content for forwarding to a mobile device, the Service may employ any device-appropriate format including anything from the subject of an e-mail or the title of a blog post to a full word-processing document to a voice or video message, depending upon the capabilities of the mobile device (e.g. screen size, on-board applications, communication channels) and the preferences of the subscriber. Since mobile devices generally provide a subset of desktop capabilities, a summary, snapshot, or lower-resolution rendering of the content is usually the preferred format.

The Service preferably forwards content in 'near-real-time', meaning that the Service is polling the content sources configured by the subscriber at the rate given in a Service Level Agreement (SLA, described hereinafter), normally on the scale of minutes. When new content is detected on any of the configured content sources, it is processed according to the subscriber's preferences and, if warranted, it is forwarded in the appropriate form to the subscriber's mobile device.

In addition to polling, the Service supports subscriber forwarding of content, for example to process e-mail arriving in a mailbox that is not accessible by POP3 or IMAP protocols, or to process alerts from a solution that does not provide programmatic access. All such content arrives in a 'forwarding mailbox', one for each Service Level Agreement level, which is then polled regularly for new content. There is also a Service-wide 'error mailbox' provided to catch messaging bounces and other problems from devices that are reached via SMTP. This mailbox is also regularly polled, and any parseable errors are automatically processed and added to the affected subscribers' Database records for later problem notification treatment.

The Service components will now be described in greater detail.

Service Class-Of-Service Agent

Figure 5:
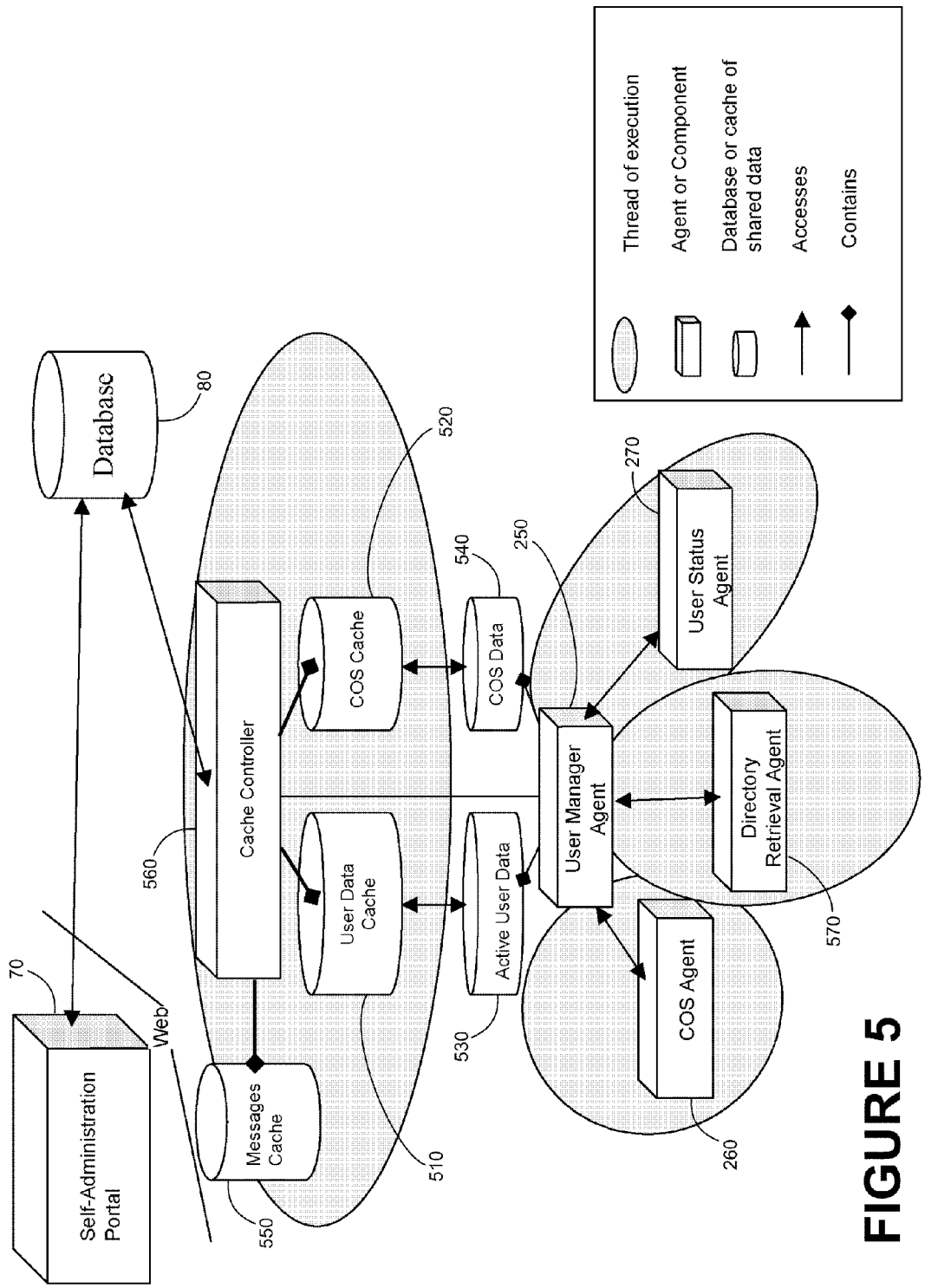
FIG. 5 shows a schematic diagram illustrating the components of the system illustrated in FIG. 1 involved in the management of subscriber accounts of the system.

With reference again to FIG. 2, and to FIG. 5 showing the components of the system involved in the management of subscriber accounts, the Class-Of-Service Agent (COSA) 260 controls the inflow of work to the Service, and acts as a coordinating point for account management as each subscriber account is processed. With respect to the alert broadcasting function of the system, however, the COSA need not be employed as, in performing such functionality, the alert message dispatcher, operating through the Administration Console 60, may manage and/or select the communications priorities governing the broadcasting of alert messages.

The system contemplates that users are classified according to a Service Level Agreement (SLA); for example, some users may receive the service without charge, while other users pay a fee. The COSA schedules work equally for all subscribers at a specific class-of-service according to the SLA, but generally gives temporal and processing priority to, e.g. paying subscribers over non-paying subscribers.

Each subscriber of the Service will have identified one or more content sources that he/she wants to have delivered to their mobile device. The COSA schedules work (a 'transaction') for each content source separately. It co-ordinates with the User Manager Agent 250 to check-out (i.e. reserve) a list of content sources which it processes (i.e. retrieves contents) simultaneously. The algorithm for checking out a content source may or may not depend on the subscriber: generally a single subscriber's content sources are scheduled for retrieval before another subscriber's sources are considered, but the COSA has information on how many transactions of each media type are active, and can leverage this to improve overall processing efficiency by scheduling different media types across different subscribers as it attempts to maintain each subscriber's SLA.

The COSA's decision to process a certain account at a certain time takes into consideration the following factors:
1. the class of service of the subscriber (i.e. premium, free, etc.) and therefore the priority of the subscriber;
2. fairness, such that all users in a specific SLA are given the same polling frequency, with the exception of when a poll takes longer than the polling frequency (in which case the account poll starts as soon as possible after the previous poll times out);
3. the type of account being processed: polling-subscriber's account, shared-forwarding account, or error account (described hereinafter); and
4. the volume of messages currently in the system.

If the system becomes too busy, due to factors such as the detection of low memory, too much subscriber content received (a good indicator of impending low memory), all pooled agents in use, an operator-imposed stand-by condition, etc., then the COSA ceases to schedule new transactions until the condition clears.

There are four 'special' subscriber content sources that the COSA must process in particular ways: a 'forwarded' account, an 'error' account, zero or more 'SMS/MMS reply' accounts, and a 'remote control' account. These may reside on any message server accessible by the system. The 'forwarded' account identifies a named Service mailbox that subscribers identify as one of their content sources. In this case, when the new e-mail is retrieved for this account, the COSA separates the e-mail into individual 'sub-transactions' for each originating subscriber found, checking out each subscriber for each sub-transaction. (Messages from unknown forwarders is discarded.) The transactions, which include the set of messages and the actual subscriber's User Data, are then forwarded to the Content Personalization Agent (CPA) 295 (and thereafter to the Content Delivery Agent (CDA) 290 for personalization and delivery as appropriate. When all individual transactions are completed the main 'forwarded' account transaction is closed.

Similarly, the 'error' account identifies another named Service mailbox that receives message bounce errors for SMTP-transmitted notifications sent by the Service. When the COSA 260 receives the new message from this mailbox from the Content Retrieval Agent (CRA) 280, it identifies the affected subscribers through matching the device e-mail address in the error e-mail. The COSA 260 then sends 'lost transaction' events to the User Status Agent (USA) 270 for each failed transmission, and the USA in turn then updates each subscriber's error status.

Similarly the 'SMS/MMS reply' account identifies one or more named Service mailboxes that receive replies to messages from SMS/MMS-enabled subscriber devices. Replies from these devices are sent from an SMS/MMS Gateway Handler (e.g. a small web application operating in the Web Application Server 50 that receives posts from the Service Provider SMS/MMS Gateway 150 and translates them to e-mail) to the named mailbox. When the COSA receives new messages from this mailbox from the CRA, it extracts the SMS message index from the message that was replied to from the mail, and the subscriber's response subject and text from each mail. The SMS indexes are matched against the transaction records stored in the User Database, and the content originator is retrieved from the matching record. The COSA then creates a transaction for the subscriber and forwards it to the CDA for delivery by electronic messaging to the original sender of the message.

Similarly, the 'remote control' account identifies a named Service mailbox that provides a subscriber-to-Service response channel for remote control of the Service while mobile. This can be supported for e-mail enabled devices directly, and for SMS/MMS-enabled devices via the same mechanism used by the 'SMS/MMS reply' method. When the COSA retrieves new e-mail from this mailbox from the CRA, it extracts the originating device address, a command, and optionally an identifier (e.g. SMS ID or e-mail subject). The originating address is matched to a subscriber account, and if present, the identifier is matched to one of the subscriber's transactions. This capability supports commands such as:

deleting e-mail that has been forwarded to the device from a mailbox;
  asking for full text of summarized content to be forwarded;
  selection of an alternate device (when multiple have been pre-configured);
  turning the Service notification on or off.

For commands that require access to a mailbox, the COSA originates a transaction for the subscriber, overriding the normal user preferences held in the User Data. Otherwise the COSA simply updates the cached User Data.

The COSA's standard responsibilities are therefore:
  to determine at what frequency the forwarding and error mailboxes are polled in relationship to the polling frequency of the subscriber accounts;
  to ensure that the each subscriber account is opened, processed and closed successfully in accordance with the SLA;
  to recognize the changing load and adapt the scheduling rate as subscribers turn off or on notification, and as new subscribers are added;
  optionally, to limit the maximum number of messages forwarded and maximum number of bytes processed per user per day;
  optionally, to limit the total number of bytes processed;
  if a subscriber is in 'notification off' mode, to not send a request through the system, whether it originates from normal subscriber processing or from the forwarded mailbox; and
  to handle errors encountered during the processing of each subscriber account, allowing the system to recover appropriately.

When subscribers configure their mailboxes to auto-forward messages to one of several communal mailboxes (one per SLA) (instead of having the Service poll the subscribers mailbox), the responsibilities of the COSA are:
  to sort the messages by username and time received;
  to validate the user identities, filtering out any spam and other non-subscriber messages; and
  to group messages by user and send each set of mail to the appropriate Content Personalization Agent Pool Manager for parsing and processing.

Service User Management Agent

The User Manager Agent (UMA) 250, shown in FIGS. 2 and 5, coordinates all access by the Service agents to subscriber accounts within the User Database 80. It provides an API supporting the various query types required by the other agents, such as adding or removing subscribers, checking for the existence of a particular subscriber, matching a subscriber name with their password, and the retrieval and storage of User Data objects that each contain all information required to processor a subscriber (account details, content sources, mobile devices, and personalization preferences).

As illustrated in FIG. 5, the UMA maintains cached copies 510, 520 of the User Data 530 and Class of Service (COS, i.e. SLA) Data 540, as well as a Messages Cache 550 of end-user messages, in the User Database 80 via a Cache Controller 560. The Cache Controller 560 independently maintains the caches 510, 520, 530 by periodically synchronizing them with the User Database 80. For efficiency, the UMA 250 also keeps read-only copies of the User Data 530 for subscriber accounts that are in a 'forward' state (i.e. not those that have temporarily turned off the Service). As the User Data 530 is changed from transaction processing, it is written back into the User Data Cache 510, which is then synchronized with the Database 80 sometime later. Similarly, if the User Data Cache 510 is updated from the User Database 80, the changes are propagated into the read-only copies for the next subscriber transaction.

The UMA 250 optionally collaborates with an optional Directory Retrieval Agent (DRA) 570 (discussed further hereinafter) for the purpose of managing subscriber population in the User Database 80. If the DRA 570 is not used, the subscriber population in the User Database 80 is managed via the Self-Administration Portal 70.

The UMA 250 collaborates with the COSA 260 for the purpose of scheduling of subscriber processing by being ready to service a request for the next user to process from the User Data Cache 510. The request for the next user could be specified as the next user of a specified SLA, as the forwarding account for a specific SLA, or as the error account for the system.

The UMA 250 further collaborates with the COSA 260 for maintaining consistent representations of subscribers' content sources, and updating dynamic information about the processing of subscriber accounts such as counts of messages processed, the number and type of errors encountered, and the success/failure of each process cycle (transaction), used for reporting purposes. The representations of subscribers' content sources generally involve taking a snapshot of the current state. For example, a mailbox state representation would include the arrival date of the last mail received at polling time, and a blog state representation would include the posting date of the last message at polling time, and a document repository representation would include the date of the last document updated at polling time.

The UMA implements the above-described database cache for efficiency reasons. The cache is updated on a periodic cycle, and holds the sets of User Data for each SLA level, the per-subscriber errors encountered, the transactions records, the parameters for each SLA level, and the list of notification messages provided to subscribers and administrators under error conditions. The cache provides the following access methods:
  check-out—read cached data and apply write lock (no additional check-out is allowed and no writes are allowed until the record is checked-in);
  read—read-only with no lock on data;
  write—write non-transaction-related data into the cache (queued if a write-lock is in place);
  check-in—write back into cache, removal of write lock, and processing of any queued writes; and
  update—write out cached data that has been changed to the database, and read in any new data provided by external sources (such as the Self-Administration Portal or the Administration Console).

In performing its alert broadcasting functionality, the system 10 may employ the User Manager Agent 250 to retrieve from the Database 80 the device addresses of any subscriber user device or other end user device. In particular, if an alert message broadcast package received by the Broadcast Agent 297 identifies target end user devices but does not also specify the device address of such end user device, then the Broadcast Agent 297 may query the Database 80 via the User Manager Agent 250 for such address.

Service Directory Retrieval Agent

As indicated above, the Service optionally includes a Directory Retrieval Agent (DRA) 570 for managing the subscriber population. It periodically accesses a network directory resource 127 (e.g. corporate directory server), optionally over an encrypted channel, to monitor membership in a named distribution list, then synchronizes the membership of that list to the subscribers held in the User Manager Agent (UMA) 250, including any changed information such as user name, mailbox name, and mailbox server.

To find the named distribution list, the DRA 570 accesses the directory server 127 (e.g. via the Lightweight Directory Access Protocol) and searches for the list of members. Once the list is found, it is traversed to discover all members, including those that are in nested distribution lists. A maximum nesting depth is used to prevent the possibility of one distribution list nesting a second distribution list that contains the first one. A further check is made to ensure there is no member duplication, and that all necessary attributes (user name, mailbox name, and mailbox server) are present.

Synchronization of the member list with the subscriber list is achieved by checking for the existence of each member in the User Database 80 (via the User Manager Agent 250). If the member is not subscribed, he/she is added to the User Database 80. If the member is already subscribed, the subscriber attributes are checked against the directory attributes, and updates are applied if necessary. If a subscriber is not in the member list, he/she is deemed to be unsubscribed, and the User Manager Agent 250 is asked to change the subscriber account status to unsubscribed.

In performing its alert broadcasting functionality, the system 10 may employ the Directory Retrieval Agent 570 to retrieve from the Directories 127 the device addresses of any subscriber user device or other end user device. In particular, if an alert message broadcast package received by the Broadcast Agent 297 identifies target end user devices but does not also specify the device address of such end user device, then the Broadcast Agent 297 may query the Directories 127 via the Directory Retrieval Agent 570 for such address.

Service User Status Agent

The User Status Agent (USA) 270 tracks subscriber account status, maintaining subscriber account status in the User Database 80 for administrative monitoring, and alerting subscribers of persistent problems experienced with their Service account. It is also responsible for extracting subscriber information from bounce/failure messages retrieved from the system error mailbox.

The USA receives events from all transaction processing agents in the application (Content Retrieval Agent 280, Content Personalization Agent 295, and Content Delivery Agent 290) for indication of subscriber transaction status updates. Specific responsibilities are:

updates subscriber status after content has been retrieved, after content has been delivered, and whenever transactions are lost;

decides when particular subscribers are in an error state based on Service Level Agreement parameters and status events;

removes subscribers from error state once Service Level Agreement conditions are satisfied;

informs subscribers by sending notifications (e-mail messages) of problems encountered while processing their e-mail; and monitors subscriber account transactions and writes closed transactions to the database.

Service Content Retrieval Agents

The Content Retrieval Agent ("CRA") 280 is a pool-able object. When given a subscriber's content source description, it dispatches a pooled agent appropriate for the content media type. For example, a mailbox source is serviced by an e-mail retrieval pooled agent, whereas a web content feed might be serviced by an RSS retrieval pooled agent.

The pooled agent connects to that subscriber's content source and downloads any new content that it has not yet seen, which generally means content that has appeared since the last poll. The method for doing this is different between different content types and standard/proprietary access protocols, hence the need for media-specific pooled agents. After retrieval completes, the CRA 280 creates an array of content items and returns these to the Class of Service Agent 260 for further processing. For example, the CRA receives a subscriber's mailbox information from the Class of Service Agent 260. It uses this information to connect via an e-mail retrieval protocol (such as secured IMAP or POP3, or a proprietary method such as Microsoft's MAPI) to the remote mail server (e.g. the Internet Mail Stores 120 shown in FIG. 1), and then downloads e-mail that has arrived later than the time of the previous poll from the subscriber's inbox (or other folder). (Note: for POP3 retrieval the entire mail folder must be downloaded and filtered through to find the new messages.) All content is left untouched on the server.

The standard CRA responsibilities are therefore:

to assign a pooled agent appropriate for the content type;

to connect to subscriber content sources;

to identify newly-arrived content by comparing to previous poll results;

to capture the new status of the content source;

to send the processing result back to the COSA; and to send a retrieval status message to the User Status Agent.

For subscribers selecting a forwarded e-mail content source (where they arrange to have e-mail forwarded to a named Service mailbox), the COSA's request to the CRA includes the account information of the shared mailbox (i.e. as a 'special' subscriber). The CRA e-mail pooled agent collects all of this mail, deletes it from the named Service mailbox, and returns it to the COSA for 'forwarded' processing. A similar approach is used for the 'error' mailbox, where the account information of the Service error mailbox (i.e. as another 'special' subscriber) are processed and returned to the COSA for 'error' processing.

So the CRA responsibilities in these situations are:

to connect to the communal mailbox;

to retrieve all of the forwarded or error messages and delete it from the server;

to get original sender (or mobile device address) from message bodies; and to send the processing results back to the COSA.

It will be appreciated that as new content types, media types, and content sources become available, the Service may be dynamically updated simply by the specification and provision of new Content Retrieval Agents configured to process such new sources. Particularly, the agent framework is extensible for operating such new Content Retrieval Agents for retrieving content from the new sources. Consequently, the remainder of the system may remain ignorant of and indifferent to the means by which the network content is retrieved for processing and forwarding to the mobile devices; even when a new Content Retrieval Agent is introduced, the same Content Personalization Agents and Content Delivery Agents may be used.

In general, the Content Retrieval Agent 280 need not be used in connection with the system's alert broadcasting functionality, inasmuch as the content of the alert message is provided by the dispatcher via the Administration Console 60 as described herein. However, it is contemplated that the Content Retrieval Agent 280 may be used in providing the alert broadcasting functionality of the system 10. For example, the alert message may be constructed by the dispatcher so as to incorporate certain content to be retrieved from an external source (e.g. a graphic image showing containing a map of an affected area, or showing a safe escape route, or an audio file containing a police announcement). In such case, the Broadcast Agent 297, described further hereinafter, may employ the Content Retrieval Agent 280 to obtain such externally-sourced content for incorporation into the alert message before communicating the message to the target user device. In general, the Content Retrieval Agent 280 may generally be employed as a means for obtaining content from any source accessible by the system 10.

Service Content Personalization Agents

The Content Personalization Agent (CPA) 295 is a poolable object used to apply user-preferences to filtering and formatting source content. When given a subscriber's content from a specific source from the Content Retrieval Agent 280 via the Class of Service Agent 260, the CPA dispatches a pooled agent appropriate for the content media type. For example, a mailbox source is serviced by an e-mail-aware pooled agent, whereas a web content feed or service alert might be serviced by an HTML-aware pooled agent. The CPA processes the set of content and creates a new array of device-dependent content to be delivered to the subscriber's device. Once it has finished processing it replaces the set of retrieved content in the payload object with the array of content to be forwarded. The payload is then forwarded to the Content Delivery Agent 290.

The CPA performs two general functions: determining whether a specific content item is forwardable, and formatting the content for presentation on the device. Determining whether a message is forwardable is implemented in several stages. First, the originator address is matched (with wildcard support) against an 'address whitelist', where a match indicates the content should be forwarded. If the 'address whitelist' is empty, the match is taken to be true. If no match is found, the text of the content (e.g. subject, body text, attachment titles, and optionally attachment text and metadata) is matched with wildcards against a 'phrase whitelist'. If no match is found, the content is deemed non-forwardable. If a match was found, the originating address is then matched against an 'address blacklist' (again with wildcard support), and the text of the content is matched against a 'phrase blacklist'. If a match is made on either of the blacklists, the content is deemed non-forwardable. Otherwise it will be forwarded to the device. These filtering methods are extendible in several ways. For example, the whitelists and blacklists can be supplemented by Service-wide lists provided by a corporate compliance officer, or could be provided in the form of category matches where the CPA matches against word lists or Bayesian filters if the User Data specifies these, or even whitelists and blacklists provided on centralized Directory Servers (e.g. a subscriber's contact list in the corporate directory).

If the content is forwardable, the CPA then formats it for presentation on the device. The formatted result can consist variously, depending on the device capabilities, channel capabilities, and user preference, of any of the following limited set of examples:

the entire content (including attachments);
just the passive or active text extracted from the content;
a summary of the text of the content;
translations of text from the content (or of summaries of the content);
a list of any attachment names;
URLs pointing to a server that provides mobile rendering of attachments;
summaries of textual attachments;
translations of attachments (or of summaries of attachments);
rendered lower definition versions of images in, e.g. attachments; and/or
extracted portions of the content or attachments (e.g. first N bytes/N seconds of a media stream).

In addition, the CPA can filter all or a part of the network content in accordance with the user preferences or otherwise.

After the set of content is processed, the CPA 295 forwards the collection along with the User Data to the Content Delivery Agent 290 for delivery if necessary.

It will be appreciated that, as new content and media types become available, as well as new methods for processing or personalization such content, the Service may be dynamically updated simply by the specification and provision of new Content Personalization Agents configured to carry out such processing or personalization. Particularly, the agent framework is extensible for operating such new Content Personalization Agents. Consequently, the remainder of the system may remain ignorant of and indifferent to the means by which the retrieved network content is processed for forwarding to the mobile devices; even when a new Content Personalization Agent is introduced, the same Content Retrieval Agents and Content Delivery Agents may be used.

In performing its alert broadcasting functionality, the system 10 may be configured such that, in preparing the alert message and broadcast package, the dispatcher using the Administration Console 60 selects the alert message format with the assistance of message templates which limit or otherwise predetermine the alert message content and form to be suitable for communication and display/performance on a related target/user device type. Such templates may be as simple as specifying that the alert message may be text only, e.g. of a limited number of characters. In such case, the system 10 need not employ the Content Personalization Agent 295. Alternatively, an alert message received from the Administration Console 60 may, at the request of the Broadcast Agent 297 or otherwise, be processed by the Content Personalization Agent 295 for, e.g. rendering the message displayable/performable on a given target user device, or context-appropriate to a target user device's logical or physical location. Any of the functionality described hereinabove in connection with the content retrieval and forwarding functionality of the system may be employed for such purpose.

Service Content Delivery Agents

The Content Delivery Agent (CDA) 290 is a pool-able agent. Its role is to forward processed content to the subscribers' devices. With the receipt of a payload of processed content from the Content Personalization Agent 295, the CDA 290 dispatches a pooled agent appropriate for the type of channel available to reach the device (e-mail, push e-mail, SMS, MMS, proprietary, etc.). The pooled agent then determines the device address (and other protocol parameters)

from the User Data sent along with the content. It then sends off the processed content to the device. For example an e-mail-enabled device receives the content via an SMTP gateway (e.g. an SMTP MTA 140 as shown in FIG. 1), and an SMS-enabled device receives the content via an SMS gateway (e.g. a Service Provider SMS Gateway 150 also as shown in FIG. 1). The CDA 290 notes pertinent details such as the content originator's address and if applicable, the SMS ID for storing in the record of the transaction that is stored in the User Database 80. (This is used by the 'SMS/MMS reply' account mechanism.)

When processed content is sent to a subscriber's device, the 'from' and/or 'reply to' addresses are set to be those of the original sender where appropriate. For example, with e-mail forwarding this allows the subscriber to reply to the originator directly from his device. For the example where e-mail is forwarded via an SMS gateway, the reply-to address maps to one of a set of specific SMS addresses which forward the received reply along with the device SMS address to one of a set of special named mailboxes for replies. These mailboxes are serviced by special 'SMS/MMS reply' subscriber accounts on the Service, where the replies are retrieved and then matched to the subscriber and forwarded to the originator by the Class of Service Agent (COSA).

When personalized content is too large for an individual device message (e.g. for SMS one message is only approximately 150 characters, or approximately 15 words), the content may be sent in several messages, subject to user personalization in the device definition. Examples of personalization include maximum message size, maximum number of separate messages, and whether or not content should be truncated to fit.

Error responses from the device are handled in protocol-specific ways. Protocols such as SMS and e-mail may experience immediate or delayed errors. Immediate errors are handled either by attempting delivery to an alternate device if one is configured (which requires special error handling by the COSA if the alternate device has a different delivery channel), or by the immediate initiation of a 'lost transaction' message to the User Status Agent or by marking the transaction as failed back to the COSA. Delayed errors, e.g. those caused by an e-mail bounce or a device being unreachable for several hours, are handled by the 'error' subscriber account method.

Secure delivery of content to the mobile device is achieved in a protocol-specific manner. For e-mail-enabled devices, if the device supports encrypted e-mail the subscriber provides his public key to the Service upon identification of the mobile device, and at the same time receives the Service public key from the subscription process. (An unencrypted e-mail containing the key is sent to the device.) When delivering the content, the CDA encrypts the mail. For SMS- or MMS-enabled devices, a similar mechanism is used, but a specific client plug-in is required on the device. This plug-in also enables the concatenation of multiple messages together to form a larger message than would otherwise be allowed given the small size of SMS messages. In this case the CDA encrypts the entire personalized content, sending it in parts to the device, where each part is sequentially tagged for parsing by the plug-in. After receiving all parts, the plug-in decrypts the message for display to the subscriber.

Such a device plug-in can be used to provide further functionality, such as recognizing 'active tags' that identify the telephone number or Instant Message chat handle of the message originator. Active tags can also be used to trigger a user action such as payment for a product or service. For devices enabled with such a plug-in, the CDA attaches the appropriate tag(s) for the originator if it matches one in a personal contact list included in the User Data provided by the COSA. When the plug-in detects the presence of one of these tags, it would enable the subscriber to initiate a voice call or IM chat at the push of a button while reading the forwarded content.

It will be appreciated that, as the capabilities of mobile devices evolve, and as the modes of communication change, the Service may be easily dynamically updated by the specification and provision of new Content Delivery Agents configured to carry out such delivery. Particularly, the agent framework is extensible for operating such new Content Delivery Agents. Consequently, the remainder of the system may remain ignorant of and indifferent to the means by which retrieved and processed network content is forwarded to mobile devices; even when a new Content Delivery Agent is introduced, the same Content Retrieval Agents and Content Personalization Agents may be used.

In performing alert broadcasting, the system 10 may employ the Content Delivery Agent 290 as described above, wherein, e.g. the Broadcast Agent 297 delivers an alert message (which may have been processed by the Content Personalization Agent 295, as described above) to the Content Delivery Agent 290 for communication to the target user devices. Alternatively, and as discussed below, the Content Delivery Agent 290 need not be used for such purpose, and the alert message may instead be communicated to the target user devices otherwise (e.g. by a pooled Broadcast Agent 297 generated for such purpose).

Service Broadcast Agents

The Broadcast Agent (BA) 297 is a pool-able agent. In general, the Broadcast Agent 297 may be configured to perform all or a part of the functionality of the delivery module 730 of the general system 710. Its role is to deliver broadcast alert messages to target devices. With the receipt of a message payload from the Administration Console 60 via the Management Adapter 65 and Management Agent 240, as described hereinabove, the BA 297 may retrieve the targeted device addresses from the information sent along with the message content. These addresses are retrieved variously from the User Manager Agent 250, from the Directory Retrieval Agent 570, or directly from local networking equipment (such as a WiFi controller), as described hereinabove. The BA 297 then passes the message and target device addresses to sets of the pooled agents it manages. In an embodiment where the functionality of the specific delivery sub-modules 800, 810, 820, 830, 860 of the general system 710 is implemented in the BA, then a number of different sub-types of pooled agents are activated in order to communicate with any particular device based on the protocol or communications path required to reach that device, e.g. SMS, MMS, SMTP, IP (proprietary), voice (proprietary/VoIP). For example, a small number of SMTP-capable pooled agents can reach a large number of e-mail-accessible devices, whereas a large number of IP-capable pooled agents would be used to reach a large number of WiFi-accessible devices. Alternatively, as described above, the BA 297 may engage the Content Delivery Agent 290 to forward the alert message to the specified target devices.

Similarly, the Broadcast Response Agent 275 is also a pool-able agent. The Broadcast Response Agent 275 may implement all or part of the functionality of the response handler 760 of the general system 710. Alternatively, such functionality may be implemented variously in other agents and described hereinbelow.

When an alert message to be broadcast is received by the BA 297, it retrieves the addresses of recipients' target devices. Recipients are specified in several ways, e.g. by attributes within the Service Database 80 (e.g. Service ID, wireless carrier used, e-mail source domain, etc.); by attributes within a Directory 127 (e.g. a corporate directory providing location, membership of a distribution list, etc.); by associations in a network infrastructure (e.g. accessible through the Communications Interfaces 125, such as an association with an access point, membership in a domain, etc.). For database-related attributes, the BA 297 may request the targeted subscriber address list (e-mail addresses and/or IP addresses and/or DNS-resolvable hostnames and/or MAC addresses and/or phone numbers) from the User Manager Agent (UMA) 250. This list may optionally include subscriber-specified device priorities, which the BA 297 may use to determine which devices to target for each subscriber. For directory-based attributes, the BA 297 may request the address list (hostnames and/or e-mail addresses and/or phone numbers) from a Directory 127. For networked-associated attributes, the BA 297 requests the address list (IP addresses and/or hostnames) from a Directory 127 and/or Communications Interfaces 125 (e.g. wireless network controllers). This may include a request for mapping MAC addresses received from the UMA 250 into the currently-assigned IP address.

The BA 297 may also combine attributes to determine the target device addresses. For example, a broadcast alert message may be targeted at the SMS devices of all subscribers whose recorded device MAC addresses are associated with a specific set of WiFi access points. In such case, the BA 297 would match MAC addresses for given access points retrieved from a wireless LAN controller against MAC addresses associated with subscriber data returned from the UMA 250 to determine the list of SMS addresses to target.

The following provides details of the functionality of the Broadcast Agent 297 when it implements the functionality of the delivery sub-modules 800, 810, 820, 830, 860 of the general system 710 rather than employing the Content Delivery Agent 290, as described above.

For delivery to e-mail addresses, the BA 297 provides the complete set of target e-mail addresses to a single SMTP-capable pooled agent. This SMTP pooled agent may divide the large list evenly into a number of smaller lists, based on a locally-configured maximum list size, then initiates an e-mail to the local MTA (e-mail gateway), blind-copying each of the recipients in the smaller lists. The MTA then transfers the e-mail to the destination e-mail as efficiently as possible based on the number of simultaneous transfers enabled on the MTA. The pooled agent lists success/failure for each e-mail address delivery in a report back to the Management Agent 240 upon completion. In another embodiment, the Broadcast Response Agent 275 may receive or otherwise obtain responding e-mail messages from the target devices for reporting to the Management Agent 240.

For delivery to SMS/MMS addresses, the BA 297 divides the list of targeted phone numbers into smaller lists by carrier, each of up to a configured maximum size.

These smaller lists are then divided up amongst the available SMS/MMS-capable pooled agents, up to a configured maximum. (Such a maximum allows for the option of broadcasting a multiplicity of different alert messages simultaneously.) Each pooled agent then initiates a connection to the carrier gateway (e.g. the Service Provider SMS/MMS Gateways 150) and initiates transfer of the messages. The transfer may be staged based on previously known characteristics of the carrier gateway traffic handling capability. The pooled agent lists success/failure for each SMS/MMS delivery in a report back to the Management Agent 240, periodically if delivery is over an extended time period, and upon completion. In one embodiment, the Broadcast Response Agent 275 is configured to receive responding SMS/MMS messages from the target user devices for reporting to the Management Agent 240.

For delivery by voice to telephony-based devices, the BA 297 divides the large list evenly across a pre-configured number of available dialer-capable pooled agents, e.g. one agent per dialer, up to a configured maximum to allow for simultaneous broadcasts. These pooled agents then request their pre-configured external dialers (e.g. in the Communications Interfaces 125) to initiate outbound voice calls over trunks or VoIP (SIP) connections, using a voice-encoded message payload. The dialer then calls each recipient, transcoding the voice-based message to the end-users when each call is answered. The dialer can optionally leverage DTMF receivers to allow recipients to confirm receipt. The dialer agent lists success/failure for each call in a report back to the pooled agent upon completion. The pooled agent then passes this report back to the Management Agent 240. In another embodiment, the Broadcast Response Agent 275 receives information from the dialer indicating success/failure for each call and reports the same to the Management Agent 240.

For delivery to IP-networked devices, the BA 297 divides the list of IP addresses and/or hostnames evenly amongst the available IP-capable pooled agents, again up to a configured maximum to ensure support of multiple simultaneous broadcasts. In the case that the system employs alert message authentication, the BA 297 first requests a tag and private key from the Key Server Agent 298, and uses the key to encrypt a part of the message, which may be the current time. The tag and encrypted time are passed along with the message, any attachments, and the target address list to the pooled agents. The pooled agents then attempt to connect to each IP device in turn on a well-known port, waiting a configured amount of time for a response. When a device accepts the connection, the pooled agent transfers the message payload, closes the connection and initiates a connection to the next device in its list. For any unreachable devices, the pooled agent retries the connection a configurable number of times before giving up. This is in case the device is moving in-and-out of a specific wireless zone, or is otherwise temporarily unable to respond. The pooled agent lists success/failure for each networked device in a report back to the Management Agent 240 upon completion. In another embodiment, the Broadcast Response Agent 275 receives information from the target devices or intermediating communications nodes or interfaces indicating success/failure for each attempted communication, and reports the same to the Management Agent 240.

The agent resident on the IP-networked devices may be pre-configured to start up when the device operating system starts up, and is preferably configured to listen on a well-known port for incoming connections. When a message payload is retrieved from the BA 297, the device agent then initiates an IP connection to the pre-configured Key Server Agent 298 (discussed further below), and passes the tag provided by the BA 297 pooled agent. The Key Server Agent 298 responds with a public key, which the device agent then uses to decrypt the message timestamp. If the timestamp decrypts successfully and is within a pre-configured window of the current time on the device, the device agent displays the message to the user, optionally with a warning bell or tone. This mechanism is intended to defeat sniffing, replay, and address spoofing attacks.

This public key method can be used for any data-networking-enabled devices, including smartphones, local wireless handsets, mobile/non-mobile PCs, etc. Other devices (like SMS/MMS-only cellphones) can be protected at a lower level by pre-configuring symmetric keys (or a list of symmetric keys to be used in order). In this case, the agent resident on the device would decrypt the message timestamp using the locally-stored key instead of requesting the key from the Key Server Agent 298. As in the public key case, the timestamp would then be compared to the local device time, and the message would only be displayed if the time matches within a configured window. Devices without an agent will provide the message to the end-user without any authentication.

Note that each pooled agent can be implemented in a protocol-specific way as described above, or can be implemented to adapt to any protocol requested of it.

Service Key Server Agents

The Key Server Agent (KSA) 298 provides a method for recipients to authenticate messages received from the Service. It is primarily seen as a method to protect devices from false alert broadcasts as described above, but could also be used to securely encrypt and authenticate single-user content notifications.

The KSA 298 maintains a time-sensitive list of key-pairs, indexed by tags. The KSA 298 creates a key-pair using public key algorithms along with its indexing tag upon request of the Broadcast Agent 297 (or the target device) when it is preparing to originate a message. The KSA 298 responds with the tag and the private key, which the requesting agent uses to encrypt all or part of the message. The KSA 298 maintains the key-pair for a pre-configured time period, usually on the order of minutes. A short life reduces the chance of attempts to playback sniffed keys in order to provide false positive authentication of broadcasts.

The KSA 298 also listens on a well-known port for external connections from devices, receiving a tag and responding with the corresponding public key, if it still exists. Devices use this key to decrypt the encrypted part of the message received from the transmitting agent. If the key doesn't exist or does not correctly decrypt, the message is not displayed to the device end-user.

Service Broadcast Response Agents

The Broadcast Response Agent 275 is a pool-able agent that collects responses to broadcasts (receipt confirmations). It may be employed to perform all or part of the functionality of the response handler 760 of the general system 710, as described above. In general, the Broadcast Response Agent 275 may be employed to receive or otherwise obtain response messages from the target user devices which acknowledge receipt of the communicated alert message and which may also provide any desired information to the Broadcast Response Agent 275.

For example, the Broadcast Response Agent may collect responses from asynchronously-connected end-user devices (e.g. SMS/MMS and e-mail devices). It may create pooled agents to listen for incoming SMS responses from, e.g. the Service Provider SMS/MMS Gateways 150, and periodically poll a pre-configured e-mail response mailbox, created and maintained for such purpose (e.g. in the Corporate Mail Stores 110), for end-user responses (or may request the Content Retrieval Agent 280 to do so). Response confirmations may be sent to the Management Agent 240 for collection and transmission to the Administration Console 60 for display and reporting.

Information Flow—Content Retrieval/Forwarding Functionality

Figure 6:
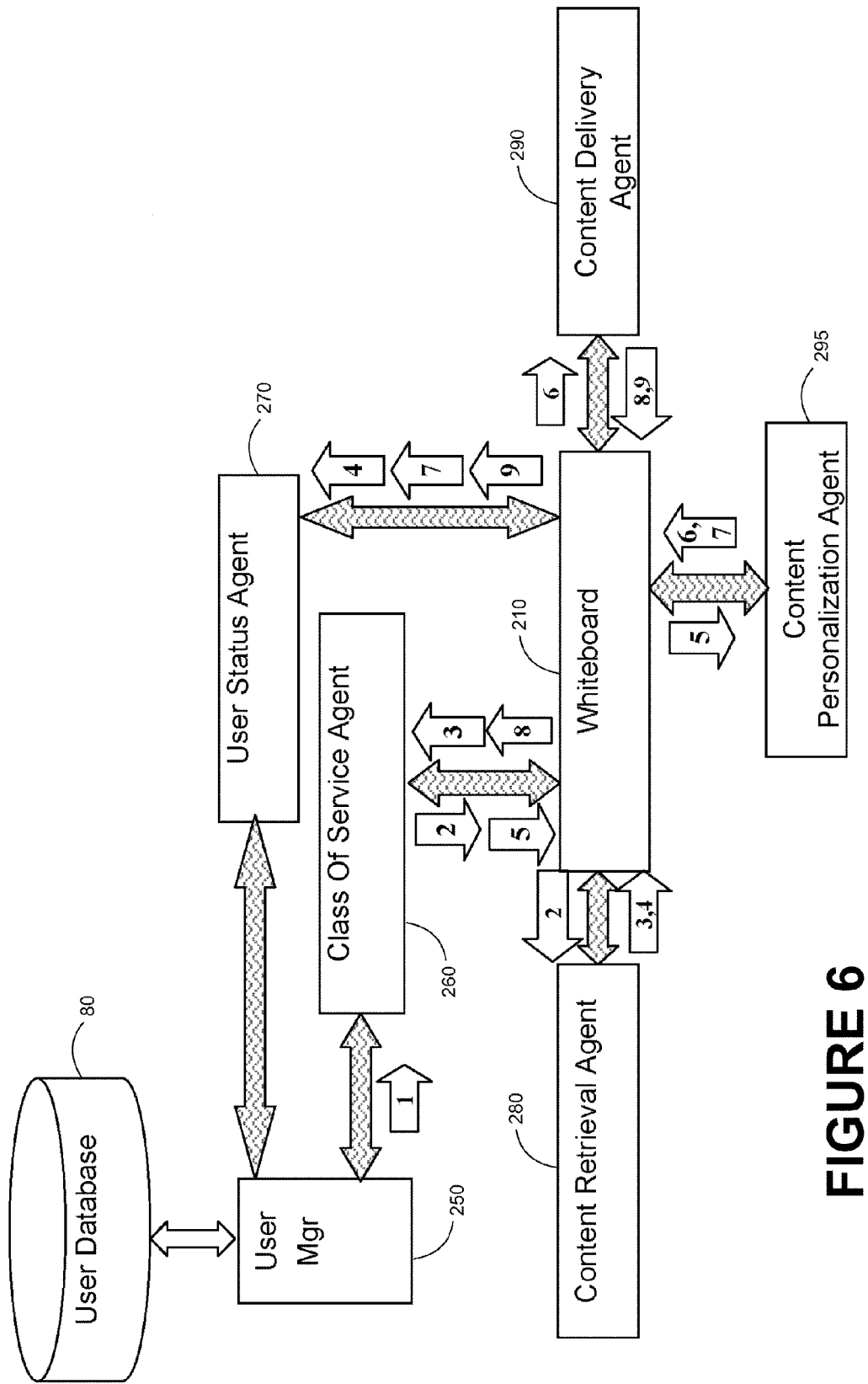
FIG. 6 shows a schematic diagram illustrating the flow of information through the system with respect to the content retrieval/forwarding service illustrated in FIG. 5.

FIG. 6 shows a schematic diagram illustrating the flow of information through the system in connection with the content retrieval and forwarding functionality of the system. Information flows in the Figure are shown as numbered open arrows and are referenced hereinafter by inclusion in brackets of the number identifying the flow. The shaded arrows in the Figure generally show information flow between the various components. In general, where a subscriber profile specifies external content to be accessed by the system, content arriving at such sources will not be retrieved by the system until the sources are polled by the system. As described above, the Class of Service Agent (COSA) 260 is configured to schedule the polling of user content sources in accordance with the Service Level Agreements (SLAs) and other parameters stored in the User Database 80. The COSA 260 therefore accesses the User Database 80 periodically via the User Manager 250 (flow [1]) in order to determine and update such scheduling.

When the polling of a subscriber's content sources is scheduled to occur, the COSA 260 notifies the Content Retrieval Agent (CRA) Pool Manager 280 (via the Whiteboard 210, as is all inter-agent communication) (flow [2]) to retrieve content from the configured sources. The message sent to the CRA Pool Manager 280 includes the subscriber User Data retrieved from the User Database 80. The CRA Pool Manager 280 then selects the next available pooled agent of the appropriate media type to perform the retrieval. The content retrieved is generally left untouched (i.e. a copy is retrieved by the CRA 280), but in appropriate cases (e.g. e-mail), if the subscriber preferences so direct the content may optionally be deleted from the source. Once the CRA pooled agent is finished its work, the CRA Pool Manager 280 then returns a collection of content to the COSA (flow [3]) (again, via the Whiteboard 210) and sends a status update to the User Status Agent (USA) 270 (flow [4]).

The COSA 260 in turn then forwards the retrieved content along with the User Data to the Content Personalization Agent (CPA) Pool Manager 295 (flow [5]) for processing. A media-appropriate CPA pooled agent is selected, which analyzes the individual content for relevance to the subscriber (per the preferences specified in the User Data), and then, when relevant, summarizes or otherwise formats the content as a separate message for the subscriber's device. The CPA 295 then forwards the collection of messages along with the User Data to the Content Delivery Agent (CDA) Pool Manager 290 (flow [6]) and sends a status update to the USA (flow [7]).

The CDA Pool Manager 290 then selects a channel-appropriate pooled agent to deliver any forwardable content to the subscriber's device. The pooled agent formats the channel 'envelope' (e.g. SMTP protocol sender and reply-to header, SMS header originator header, etc.) to indicate an appropriate return address, allowing the subscriber to respond to the message if appropriate. Upon completion of transmission, the CDA 290 sends notification to both COSA 260 (flow [8]) and the User Status Agent 270 (flow [9]) (for monitoring of subscriber account status).

When the COSA 260 receives notification of completion of that request, the account is checked back into the database.

Timer expirations at any stage of transaction processing will lead to a transaction being flagged as having been 'lost'. Depending upon the protocol scenario, the timeouts can require that a pooled agent be forcefully terminated (and then re-incarnated) by the Pool Manager (e.g. a timeout when retrieving e-mail from a POP3 mailbox). Smarter protocols provide their own timers, allowing the pooled agent to recover. In both cases, the 'transaction lost' message is sent to the USA, and the appropriate response message is sent to the COSA to indicate the transaction has completed (albeit unsuccessfully).

Many subscriber transactions can be in process in the Service simultaneously, bound by the high water marks of the numbers of content retrieval, processing, and delivery agents. Each transaction follows the information flow described above.

Embodiment Options

Although various exemplary embodiments of the invention have been disclosed, it should be apparent to those skilled in the art that various changes and modifications can be made which will achieve some of the advantages of the invention without departing from the true scope of the invention.

Embodiments of the invention may be implemented in any conventional computer programming language. For example, preferred embodiments may be implemented in a procedural programming language (e.g. "C") or an object oriented language (e.g. "C++"). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

It is to be appreciated that the section headings appearing hereinbefore do not limit the scope of the invention as described but are merely intended to organize the description for the sake of clarity.

With the foregoing exemplary embodiments having been disclosed, it will be apparent to those skilled in the art that various changes and modifications can be made to appropriately suit the needs and objectives of another application and still achieve the advantages of the invention; all such changes and modifications are intended to fall within the scope of the invention as defined by the claims that follow.

What is claimed is:

1. A system for communicating a message to a plurality of recipients, each recipient being associated with a respective communications device, each device being a respective one of a plurality of device types, each device having a respective address, the system comprising a processor and a memory containing instructions executable by the processor to provide:

a dispatch module for receiving the alert message, message subscriber data, and recipient identification criteria, the message subscriber data identifying ones of the recipients and their associated communications devices and addresses, wherein the dispatch module is for compiling a list of the recipients based in part on the message subscriber data, and wherein the dispatch module is for communicating with a communications node accessible to the system for receiving from the communications node an identification of ones of the communications devices accessible via that communications node based on the recipient identification criteria, wherein the recipient identification criteria specify a logical or physical proximity of the devices to the communications node or a specified location, wherein the dispatch module is further for compiling the list of the recipients based in part on the identification received from the communications node, wherein the communications node is a network access point which is wired or wireless, and at least one of the communications devices accessible via that communications node is different from the communications devices identified in the message subscriber data;

a delivery module for receiving from the dispatch module the message and the list of the recipients, the delivery module being further for receiving the device addresses based on the list of the recipients, the delivery module being further for communicating the message to the devices, the delivery module having for each device type a corresponding delivery sub-module for communicating the message to the devices of that device type; and a database for receiving and storing the message, the list of the recipients, an identifier for each recipient, the device types, and the device addresses.

2. The system according to claim 1 wherein the dispatch module is further for compiling the list of the recipients based on data received from an external directory accessible by the system.

3. The system according to claim 2 wherein the dispatch module compiles the list of the recipients by polling the external directory which includes a directory of client computer hostnames configured in a network domain.

4. The system according to claim 1 wherein the dispatch module compiles the list of the recipients by polling the network access point for the devices accessible via that network access point based on the recipient identification criteria.

5. The system according to claim 1 wherein the dispatch module or the delivery module is further for querying the database, an external directory or the communications node for the device addresses based on the recipient identification criteria.

6. The system according to claim 1 wherein the network access point is a wireless network access point and the devices accessible via the wireless network access point are capable of receiving SMS or MMS messages.

7. The system according to claim 6 wherein at least one of the devices accessible via the wireless network access point is a cellular telephone.

8. The system according to claim 1 wherein the device types include devices capable of receiving e-mail messages, SMS or MMS messages, voice messages, IP messages, or messages via HTTP.

9. The system according to claim 1 wherein at least one device type is capable of operating a client application for receiving the alert message from the delivery module, the client application being further for authenticating the alert message.

10. The system according to claim 9 further comprising a key server module for generating a new private key, a new public key corresponding to the private key, and a new message tag associated with the private key and public key, the key server further communicating the private key and the message tag to the dispatch module, the dispatch module being further for encrypting a portion of the alert message based on the private key, the delivery module being further for receiving the message tag from the dispatch module and for communicating the message tag to the devices being of the at least one device type capable of operating the client application, the client application being further for querying the key server module based on the message tag for the public key corresponding to the private key and for decrypting the encrypted portion of the alert message based on the public key thereby authenticating the alert message.

11. The system according to claim 10 wherein the portion of the alert message includes a timestamp of the alert message.

12. The system according to claim 8 wherein at least one device type is capable of receiving voice messages, the alert message includes a text message, and the delivery module is further for converting the text message into an audio recording and communicating the audio recording to the devices of that device type.

13. The system according to claim 12 wherein at least one of the devices of the device type capable of receiving voice messages is a telephone, a cellular telephone, or a computer.

14. The system according to claim 1 further comprising a response handler for receiving respective acknowledgement messages from each of the devices, wherein the database is further for storing the respective acknowledgement messages.

15. The system according to claim 14 wherein at least one of the acknowledgement messages is an e-mail message, an SMS or MMS shortcode, a series of DTMF tones, or a voice-recognized command.

16. The system according to claim 14 wherein the dispatch module is further for establishing two-way communication with at least one of the devices from which the response handler has received a respective acknowledgement message.

17. The system according to claim 14 further comprising a reporting module for generating reports indicating a success or a failure of the communication of the message to at least one of the devices.

18. The system according to claim 1 wherein at least one of the devices accessible via the network access point is unassociated with the network access point.

19. A system for communicating an alert message to a plurality of recipients, each recipient being associated with a respective communications device, each device being a respective one of a plurality of device types, each device having a respective address, the system comprising a processor and a memory containing instructions executable by the processor to provide:
dispatch means for receiving the alert message, message subscriber data, and recipient identification criteria, the message subscriber data identifying ones of the recipients and their associated communications devices and addresses, wherein the dispatch means is for compiling the list of the recipients based in part on the message subscriber data, and wherein the dispatch means is for communicating with a communications node accessible to the system for receiving from the communications node an identification of ones of the communications devices accessible via that communications node based on the recipient identification criteria, wherein the recipient identification criteria specify a logical or physical proximity of the devices to the communications node or a specified location, wherein the dispatch means is further for compiling the list of the recipients based in part on the identification received from the communications node, wherein the communications node is a network access point which is wired or wireless, and at least one of the communications devices accessible via that communications node is different from the communications devices identified in the message subscriber data;
an agent framework operatively connected to the dispatch means, the agent framework operating a plurality of autonomous agents including:
a broadcast agent for receiving from the dispatch means the alert message and the list of recipients, the broadcast agent being further for receiving the device addresses; and
a content delivery agent for communicating the alert message to the devices, the content delivery agent having a corresponding pooled agent for each device type for communicating the alert message to the devices of that device type; and
a database for receiving and storing the alert message, the list of the recipients, the device types, and the device addresses.

20. The system according to claim 19 wherein the plurality of autonomous agents further includes:
a content retrieval agent for retrieving content from an external source, wherein the broadcast agent is further for receiving the content from the content retrieval agent and for associating the content with the alert message, and wherein the content delivery agent is further for receiving the content and for communicating the content to the devices in association with the alert message.

21. The system according to claim 1 wherein communicating with the network access point to identify the devices accessible via that network access point comprises obtaining a list of MAC addresses, IP addresses, or hostnames accessible via that network access point.

22. A method of communicating a message to plurality of recipients, each recipient being associated with a respective communications device, each device being a respective one of a plurality of device types, each device having a respective address, the method comprising:
receiving the alert message and message subscriber data, the message subscriber data identifying ones of the recipients and their associated communications devices and addresses;
communicating with a communications node for receiving from the communications node an identification of ones of the communications devices accessible via that communications node based on recipient identification criteria specifying a logical or physical proximity of the devices to the communications node or a specified location, wherein the communications node is a network access point which is wired or wireless, and at least one of the communications devices accessible via that communications node is different from the communications devices identified in the message subscriber data;
compiling a list of the recipients based on the message subscriber data and the identification received from the communications node;

receiving the device addresses based on the list of the recipients;

communicating the message to the communications devices; and storing the message, the list of the recipients, and the device addresses in a database.

23. The method according to claim 22, wherein at least one of the communications devices operates a client application for authenticating the message, the method further comprising:

providing a private key, a public key corresponding to the private key, and a message tag associated with the private key and public key;

providing a key server providing the public key;

prior to communicating the message to that communications device, encrypting a portion of the message based on the private key;

receiving the message in that communications device;

querying in that communications device the key server based on the message tag to receive the public key;

decrypting in that communications device the encrypted portion of the message based on the public key thereby authenticating the message.

24. The method according to claim 23, wherein the encrypted portion of the message includes a timestamp of the message, and the communications device further authenticates the message by determining that the timestamp falls within a predetermined time/date range.

* * * * *